US010725209B2

(12) United States Patent
Wang et al.

(10) Patent No.: US 10,725,209 B2
(45) Date of Patent: Jul. 28, 2020

(54) BROADBAND AND OMNIDIRECTIONAL POLYMER ANTIREFLECTION COATINGS

(71) Applicant: The Penn State Research Foundation, University Park, PA (US)

(72) Inventors: Baomin Wang, State College, PA (US); Noel C. Giebink, State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 16/465,641

(22) PCT Filed: Jan. 9, 2018

(86) PCT No.: PCT/US2018/012913
§ 371 (c)(1),
(2) Date: May 31, 2019

(87) PCT Pub. No.: WO2018/136259
PCT Pub. Date: Jul. 26, 2018

(65) Prior Publication Data
US 2020/0025977 A1    Jan. 23, 2020

Related U.S. Application Data

(60) Provisional application No. 62/447,060, filed on Jan. 17, 2017.

(51) Int. Cl.
*G02B 1/111* (2015.01)
*C09D 127/12* (2006.01)
*G02B 1/12* (2006.01)

(52) U.S. Cl.
CPC ............ *G02B 1/111* (2013.01); *C09D 127/12* (2013.01); *G02B 1/12* (2013.01)

(58) Field of Classification Search
CPC .......... G02B 1/111; G02B 1/12; C09D 127/12
See application file for complete search history.

(56) References Cited

U.S. PATENT DOCUMENTS

| 5,288,528 A * | 2/1994 | Blanchet-Fincher .... B05D 1/62 427/255.6 |
| 5,991,081 A * | 11/1999 | Haaland ................ C03C 17/225 359/580 |
| 6,613,393 B1 | 9/2003 | Rauschnabel et al. |

OTHER PUBLICATIONS

Wang, Baomin et al., Durable broadband ultralow index fluoropolymer antireflection coatings for plastic optics; Optica, 2017, 239-242, vol. 4, No. 2, Optical Society of America.

(Continued)

*Primary Examiner* — Kelly M Gambetta
(74) *Attorney, Agent, or Firm* — Buchanan Ingersoll & Rooney PC

(57) ABSTRACT

A method for generating antireflective coatings for polymeric substrates using a deposition process and/or a dissolving process can provide a coating onto the outer surface of the substrate. Some embodiments can include a GLAD generated fluoropolymer coating or a co-evaporated fluoropolymer coating on a substrate that may achieve ultralow refractive index as well as improved adhesion and durability properties on polymeric substrates. In some embodiments, the deposition process is performed such that a fluoropolymer can be evaporated to form chain fragments of the fluoropolymer. The chain fragments diffused into the substrate can subsequently re-polymerize, interlocking with the polymer chains of the substrate. In some embodiments, the co-evaporation process can form a nanoporous polymer chain scaffold of the fluoropolymer, from which a sacrificial material can be dissolved out. The formed coating can be a multilayer or continuously-graded antireflective coating that has strong adhesion with the substrate.

20 Claims, 28 Drawing Sheets

(56) References Cited

OTHER PUBLICATIONS

Nason, T.C. et al., Deposition of Amorphous Fluoropolymer thin films by the thermolysis of Teflon amorphous fluoropolymer, 1992, 1866-1868, Appl. Phys. Lett. 60 (15), American Institute of Physics.
Blanchet, G.B. et al., Deposition of polytetrafluoroethylene films by laser ablation, 1993, 1026-1028, Appl. Phys. Lett., vol. 62, No. 9, American Institute of Physics.
International Search Report and Written Opinion of PCT/US18/12913 dated Jun. 29, 2019 filed Jan. 9, 2018.

* cited by examiner

BROADBAND AND OMNIDIRECTIONAL POLYMER ANTIREFLECTION COATINGS

CROSS-REFERENCE TO RELATED APPLICATIONS

This patent application is related to and claims the benefit of priority to U.S. Provisional Application No. 62/447,060 filed on Jan. 17, 2017, the entire contents of which is incorporated herein by reference.

STATEMENT REGARDING FEDERALLY SPONSORED RESEARCH AND DEVELOPMENT

This invention was made with government support under Grant No. DE-AR0000626 awarded by the Department of Energy and under Grant No. CBET1508968 awarded by the National Science Foundation. The Government has certain rights in the invention.

FIELD OF THE INVENTION

Embodiments of the invention relate to generating antireflective coatings for polymeric substrates using glancing angle deposition or other process, apparatuses used to generate such coatings, the formed coatings, substrates having such coatings, and innovations related thereto.

BACKGROUND OF THE INVENTION

Examples of conventional antireflection coatings may be understood from U.S. Patent Publ. No. 2006/0099396, U.S. Patent Publ. No. 2010/0259823, U.S. Patent Publ. No. 2013/0271843, U.S. Patent Publ. No. 2014/0202984, U.S. Patent Publ. No. 2014/0374377, U.S. Patent Publ. No. 2016/0233825, U.S. Pat. Nos. 7,914,852, and 5,900,288. Current broadband antireflection (AR) coatings can play a role in applications ranging from optical lenses and imaging systems to displays, solar concentrators, and/or photovoltaics.

Conventional antireflection systems and methods may not be well-suited for some optical systems (e.g., plastic optics). This may be due to poor adhesion, large thermal expansion mismatch, inherent limitations in coating process temperature, and/or other deficiencies. In addition, conventional antireflection systems and methods may operate at limited bandwidths (e.g., to the visible spectral range). Moreover, the complexity (e.g., most can include use of four or more layers) of traditional systems and methods may provide additional obstacles.

SUMMARY OF THE INVENTION

Anti-reflective coatings and methods of preparing such coatings are disclosed herein. Some embodiments can include nanostructuring the coating to grade the refractive index thereof. Some embodiments can include grading the refractive index via low pressure and/or low temperature techniques. An embodiment of the coating may be applied to a substrate for an optical system (e.g., a curved lens, a Fresnel lens, etc.). An embodiment of the coating may exhibit curved surface compatibility with the substrate. Some embodiments may include glancing angle deposition (GLAD) to generate an embodiment of the coating on an embodiment of the substrate. Some embodiments can include a selective dissolution technique to generate an embodiment of the coating on an embodiment of the substrate. Some implementations may facilitate generating a fluoropolymer coating applied to a polymeric substrate that may be composed of a polymeric material such as, for example, acrylic material, polycarbonate material, Cyclo Olefin Polymeric material (e.g. Zeonex brand cyclo olefin polymeric material), cyclic olefin copolymeric material (e.g. TOPAS brand cyclic olefin copolymers), polyethylene material, or a plastic material.

Embodiments can further include an optical component that may include an embodiment of the coating applied to at least a portion of an embodiment of the substrate configured for use as an optical element (e.g., a lens). This may be done to modify the optical transmittance through the substrate. An embodiment of the optical component may exhibit broadband, omnidirectional antireflective performance and/or extreme durability. The deposition of the coating may be performed such that the coating material is cleaved into molecular fragments that subsequently diffuse into the polymer substrate's surface and then re-polymerizes in interlocking fashion with the polymer chains of the polymer substrate at the surface of the substrate to be coated with the coating. The diffusion and re-polymerization may occur within a depth extending from the outer surface into the substrate (e.g. extending from the outer surface of the substrate into the first 1 micrometer ($\mu$m) of the substrate, which can be considered as extending from the surface into a depth of 1 $\mu$m into the substrate, extending from the outer surface of the substrate into the first 10-50 nanometers (nm) of the substrate, which can be considered as extending from the outer surface into a depth of 10-50 nm of the substrate, etc.).

In at least one embodiment, a method of generating an antireflective coating can include forming a coating on a surface of a polymeric substrate via a deposition process. The forming of the coating onto the surface of the substrate can occur such that the coating material is vaporized to form chain fragments of the coating material during vaporization of the coating material, the vaporized chain fragments are subsequently diffused into the surface of the polymeric substrate to a depth into the surface of the substrate as layers of the chain fragments are applied onto the surface of the substrate, and the chain fragments diffused into the substrate are subsequently re-polymerized to interlock with polymer chains of the substrate.

In some embodiments, the coating material can include a fluoropolymer. In some embodiments, the coating material can include a polymetric material. In some embodiments, the substrate can be plastic, acrylic or polycarbonate. In some embodiments, the substrate can be curved. In some embodiments, the substrate can be a curved lens. In some embodiments, the substrate can be a Fresnel lens. In some embodiments, the deposition process can be a glancing angle deposition (GLAD) process. In some embodiments, the GLAD process can include maintaining the substrate at a temperature that is below the glass transition temperature of the substrate. In some embodiments, vaporization of the coating material occurs via evaporation of the coating material. In some embodiments, the substrate can be a lenslet array.

In at least one embodiment, an optical component can include a substrate configured for use as an optical element, the substrate having a coating formed on at least a portion of a surface of the substrate. The coating can be formed by an embodiment of the methods disclosed herein.

In at least one embodiment, a method of generating an antireflective coating can involve forming a layer of material
} on a surface of a polymeric substrate via a co-evaporation process. The layer of material can include a first material and a second material. The first material can be a coating. The second material can be a material that is dissolvable by a solvent without dissolving the first material. Forming the layer of material onto the surface of the substrate can occur such that the first material and the second material are vaporized and co-deposited onto the surface of the substrate, wherein the first material re-polymerizes to form a continuous, nanoscale polymer chain network. The method can further involve exposing the second material deposited on the substrate to the solvent for dissolving at least a portion of the second material deposited on the surface of the substrate to remove the second material from the substrate and remove the second material from the first material. Dissolving at least a portion of the second material can include removing all or 100% of the second material, removing 95% of the second material (or any percent within a range of 100% to 95%), removing 90% of the second material (or any percent within a range of 100% to 90%), removing 85% of the second material (or any percent within a range of 100% to 85%), removing 80% of the second material (or any percent within a range of 100% to 80%), removing 75% of the second material (or any percent within a range of 100% to 75%), removing 70% of the second material (or any percent within a range of 100% to 70%), removing 65% of the second material (or any percent within a range of 100% to 65%), removing 60% of the second material (or any percent within a range of 100% to 60%), removing 55% of the second material (or any percent within a range of 100% to 55%), removing 50% of the second material (or any percent within a range of 100% to 50%), removing 45% of the second material (or any percent within a range of 100% to 45%), removing 40% of the second material (or any percent within a range of 100% to 40%), removing 35% of the second material (or any percent within a range of 100% to 35%), removing 30% of the second material (or any percent within a range of 100% to 30%), removing 25% of the second material (or any percent within a range of 100% to 25%), removing 20% of the second material (or any percent within a range of 100% to 20%), removing 15% of the second material (or any percent within a range of 100% to 15%), removing 10% of the second material (or any percent within a range of 100% to 10%), removing 5% of the second material (or any percent within a range of 100% to 5%), or removing or any percent within a range of 100% to 0.01%).

In some embodiments, the second material can include 4,4-bis[N-(1-naphthyl-1)-N-phenyl-amino]-biphenyl (NPD). In some embodiments, the solvent can be acetone or include acetone. In some embodiments, the layer of material can include a mixture including the first material at a first vol % and the second material at a second vol %. In some embodiments, the solvent can be at least one of acetone, isopropanol, tetrahydrafuran, chlorobenzene, toluene, and cyclohexane. In some embodiments, the substrate can be plastic, acrylic or polycarbonate. In some embodiments, the substrate can be curved. In some embodiments, the substrate can be at least one of a curved lens, a Fresnel lens, and a lenslet array.

In at least one embodiment, an optical component can include a substrate configured for use as an optical element, the substrate having a coating formed on at least a portion of a surface of the substrate. The coating can be formed by an embodiment of the methods disclosed herein.

In some embodiments, an optical component can include a substrate configured for use as an optical element, the substrate having the coating formed on at least a portion of a surface of the substrate. The coating can include the layer of material being formed by an embodiment of the methods disclosed herein.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present innovation will be more apparent from the following more particular description thereof, presented in conjunction with the following drawings. Like reference numbers used in the drawings may identify like components.

DETAILED DESCRIPTION OF THE INVENTION

Figure 1:
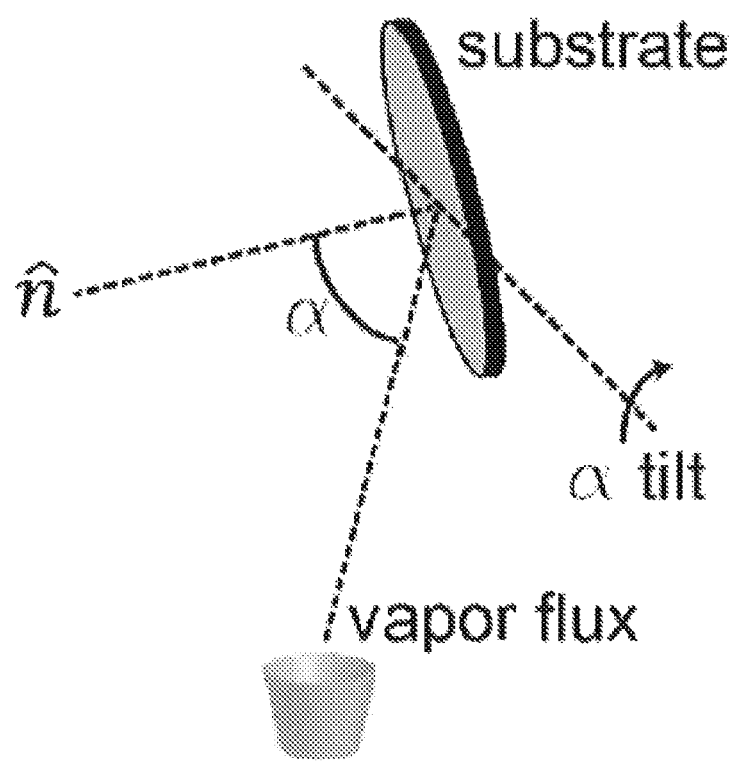
FIG. 1 is a schematic illustrating an exemplary glancing angle deposition (GLAD) geometry that may be used with an embodiment of the method.

The following description is of exemplary embodiments that are presently contemplated for carrying out the present invention. This description is not to be taken in a limiting sense, but is made merely for the purpose of describing the general principles and features of various aspects of the present invention. The scope of the present invention is not limited by this description.

An embodiment of the method can include generating a coating. The coating can include an antireflective (AR) coating. The coating can include a graded index AR coating. For example, the coating can be configured as a continuously graded index AR coating. As another example, the coating may have multiple layers with the refractive index varying in discrete steps. Embodiments of the coating can also be configured to be a combination of a continuously graded index AR coating at least one layer of the coating while the coating also has multiple other layers with the refractive index varying in discrete steps.

The AR coating may be a polymer coating. For instance, the AR coating may be a fluoropolymer AR coating, a PETG (polyethylene terephthalate glycol-modified) coating, etc.

This coating may be composed of an amorphous fluoropolymer, such as, for example, a Teflon™ amorphous fluoropolymer (AF) coating. An embodiment of the method can include generating an embodiment of the coating via glancing angle deposition (GLAD). This may be done by generating an embodiment of the coating on an embodiment of a substrate via GLAD. An embodiment of the method can include generating an embodiment of the coating via a selective dissolution technique. This may be done by generating an embodiment of the coating on an embodiment of a substrate via selective dissolution. In some implementations, a plurality of coatings can be formed on an outer surface of an embodiment of a polymeric substrate (e.g. an acrylic substrate, a polycarbonate substrate, a plastic substrate, etc.).

The substrate may be configured as an optical element, such as a lens or a lenslet array for example. An embodiment of the substrate and an embodiment of the coating may be used to generate an optical component. This may be done to modify the optical transmittance through an embodiment of the substrate. This may also be done to generate an optical component that may exhibit broadband, omnidirectional antireflective performance and/or extreme durability. For example, embodiments of the method can be used to generate an extremely durable graded index AR coating that may reduce the solar spectrum-averaged (400<$\lambda$<1600 nm) reflectance of acrylic and/or polycarbonate plastic substrates to <0.5% over a wide range of incidence angles.

An embodiment of the substrate may exhibit various shapes, sizes, and or surface ornamentation. For example, the substrate may be flat, curved, convex, concave, angled, etc. The substrate may have a rectangular profile, a square profile, a circular profile, an elliptical profile, an oval profile, a hexagonal profile, a polygonal profile, etc. The substrate may be fabricated from any suitable optical material, such as silicon, glass, plastic, acrylic, polycarbonate, etc.

Figure 18:
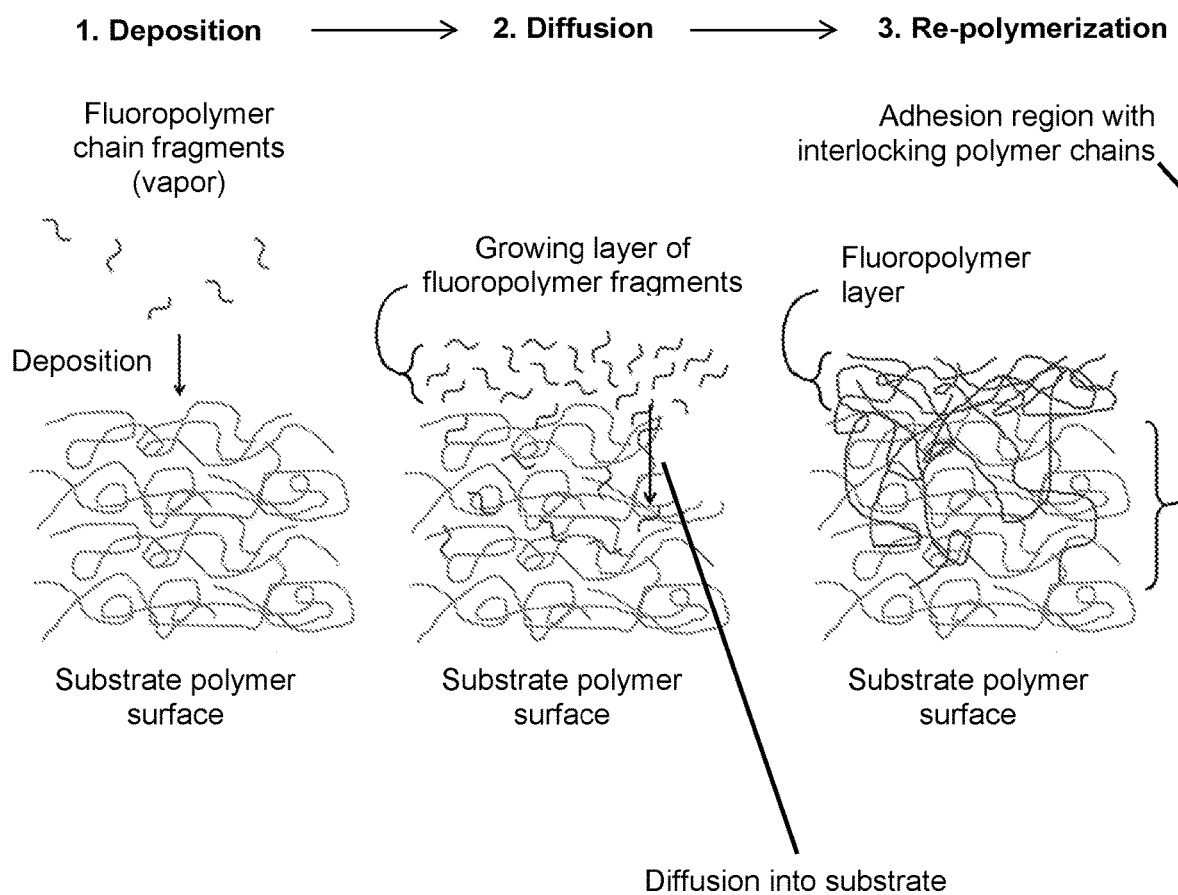
FIG. 18 shows an exemplary process of coating a polymeric substrate. The process of FIG. 18 illustrates a fluoropolymer material being vaporized such that the fluoropolymer is cleaved into fragments and that those cleaved fragments subsequently diffuse into the surface to of the substrate prior to re-polymerizing into the outer surface of the substrate via an embodiment of the method to form a coating over the outer surface of the substrate that is adhered to the surface via the re-polymerization of the cleaved fragments of the fluoropolymer that diffused into the outer surface.

Embodiments of the coating can adhere strongly and deliver durability and other advantages when applied to optical plastic substrates (such as, acrylic and polycarbonate, for example) due to a unique molecular scale diffusion and interlocking process that can be initiated at the outer surface of the substrate via use of an exemplary embodiment of the process for coating the outer surface of the substrate (see e.g. FIG. 18). Embodiments of the coating formed via embodiments of the process can be configured to exhibit strong adhesion to the substrate due to the unique diffusion and interlocking promoted by the process. The formed coating can also exhibit outstanding resistance to heat, humidity, dirt, ultraviolet light, outdoor exposure, solvents, acids, bases, abrasion, and repeated bend/compression cycling. Some embodiments of the coatings can be configured to survive repeated mechanical bend and compression cycles on substrates flexed to a one centimeter radius.

Some embodiments of the formed coatings can be configured to be hydrophobic. For example some embodiments of the coatings can exhibit a water contact angle of greater than 140°. This may be used to support anti-fogging behavior of the substrate. Some coatings can be configured to be impervious to most organic solvents, acids, and/or bases. Some coatings can be configured to be unaffected by prolonged ultraviolet light exposure. For example, some coatings can be configured to exhibit little to no deterioration in AR performance after ten days of damp heat testing (temperature (T)=85° C. and relative humidity (RH)=85%). Some coatings can exhibit little to no deterioration in AR performance after being exposed to an environmental conditions (e.g., after one month of continuous rooftop outdoor exposure).

In at least one implementation, an embodiment of a coating can be applied to a substrate that has curved surfaces for a reciprocal focal length of f/1. An embodiment of a coating may also be applied to at least one side of an f/2 acrylic Fresnel lens. In some embodiments, an embodiment of a coating can increase a solar spectrum-averaged transmittance of a substrate from approximately 92% to 98%.

FIG. 1 depicts an exemplary GLAD geometry that may be used with an embodiment of the method. The method may include an evaporation source to generate a vapor flux for a fluoropolymeric coating material to be used for providing a coating onto the outer surface of substrate. An embodiment of the substrate may be tilted at angle $\alpha$ relative the vapor flux incident from the evaporation source of the coating material. An embodiment of the method may utilize a GLAD process to generate an embodiment of the coating on at least a portion of an embodiment of the substrate. In some implementations, an embodiment of the method can be used to generate a single coating layer or a coating comprised of a plurality of coating layers on an outer surface of an embodiment of the substrate.

Figure 2:
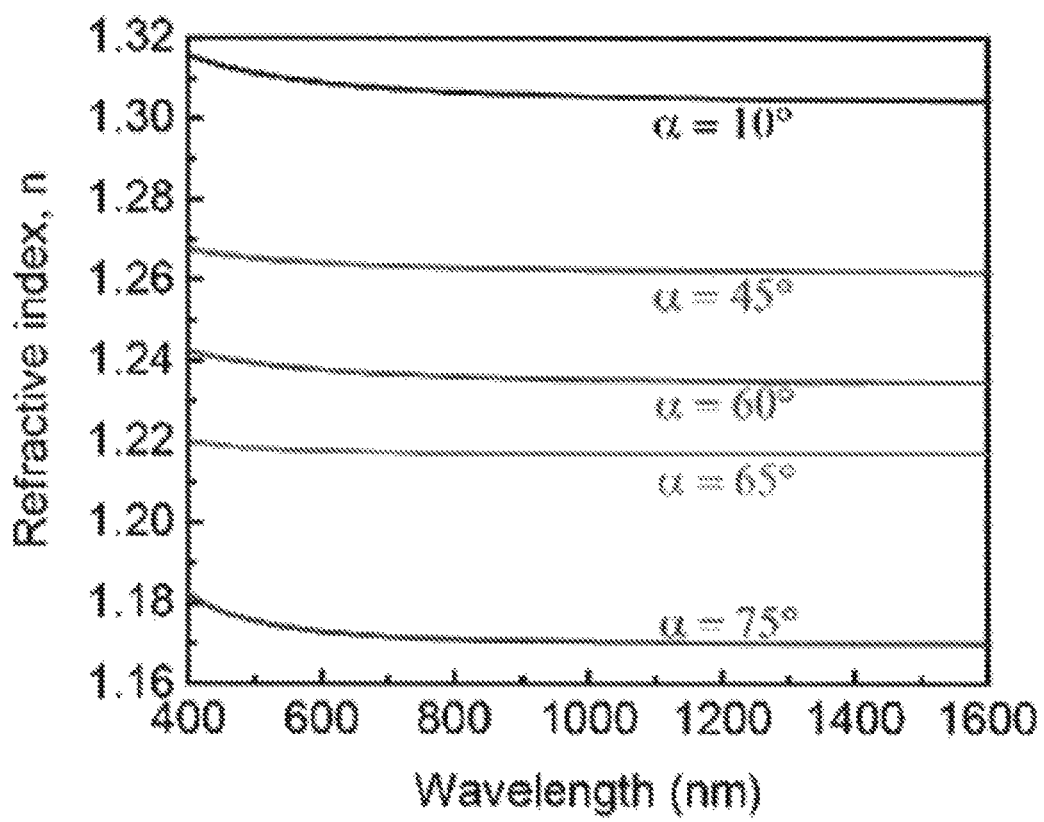
FIG. 2 shows refractive index dispersion of embodiments of coatings formed as Teflon™ amorphous fluoropolymer (AF) films evaporated on an embodiment of a silicon substrate at different substrate angles, $\alpha$.

Some embodiments may be used to create a nanoporous film on an outer surface of the substrate as a coating of the substrate. In some embodiments, self-shadowing effects may be used to facilitate controlling a wide range of refractive indexes of the coating. FIG. 2 shows refractive index dispersion plots of thermally evaporated films of Teflon™ AF 1600 (amorphous fluoropolymer powder available from Chemours Co.) as exemplary coatings that may be generated by an embodiment of the method. The refractive index dispersion measured via spectroscopic ellipsometry in these embodiments shown in FIG. 2 varies from n≈1.31 to n≈1.17 for $\alpha$=10° and $\alpha$=75°, respectively.

Embodiments of the method can include depositing an embodiment of the coating on an embodiment of a substrate at a nominal rate of ~3 nanometers/second. Embodiments of the method may further include using a chamber base pressure of ~$10^{-7}$ Torr of the evaporation source to generate a vapor flux of an embodiment of the coating for deposition. Embodiments of the method may further include maintaining the temperature of an embodiment of substrate at negative 30° Celsius during deposition. Embodiments of the method may further include a source-to-substrate distance of approximately 30 centimeters. This may facilitate a ±5% deposition uniformity across an embodiment of a substrate. For example, a ±5% deposition uniformity may be achieved across a 100 millimeter surface portion of a substrate. Some embodiments can include a combination of high deposition rate and low substrate temperature. This may be done to facilitate achieving a low refractive index for the coating at high deposition angles during deposition. Some embodiments can achieve the lowest refractive index for the coating at a particular high deposition angle. Any embodiment of coating can be configured to be specular by eye. Any embodiment of a coating can be configured to be transparent deep into the ultraviolet for wavelengths $\lambda$ greater than 200 nanometers (nm).

Figure 3:
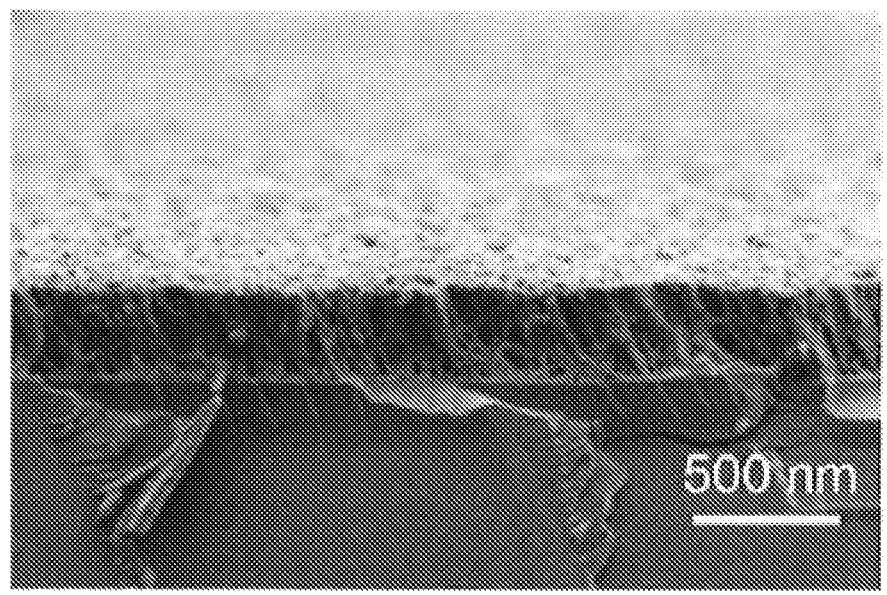
FIG. 3 is a cross-sectional scanning electron micrograph of an embodiment of a coating formed as a Teflon AF film deposited on an exemplary embodiment of a silicon substrate at $\alpha=75°$.

FIG. 3 shows a cross sectional scanning electron micrograph of a 305 nanometer thick coating deposited on silicon substrate at $\alpha$=75°. It can be seen that the coating may exhibit a tilted nanostructure. The porosity of the coating may be deeply subwavelength (e.g., having dimensions less than the wavelength of light).

Figure 4:
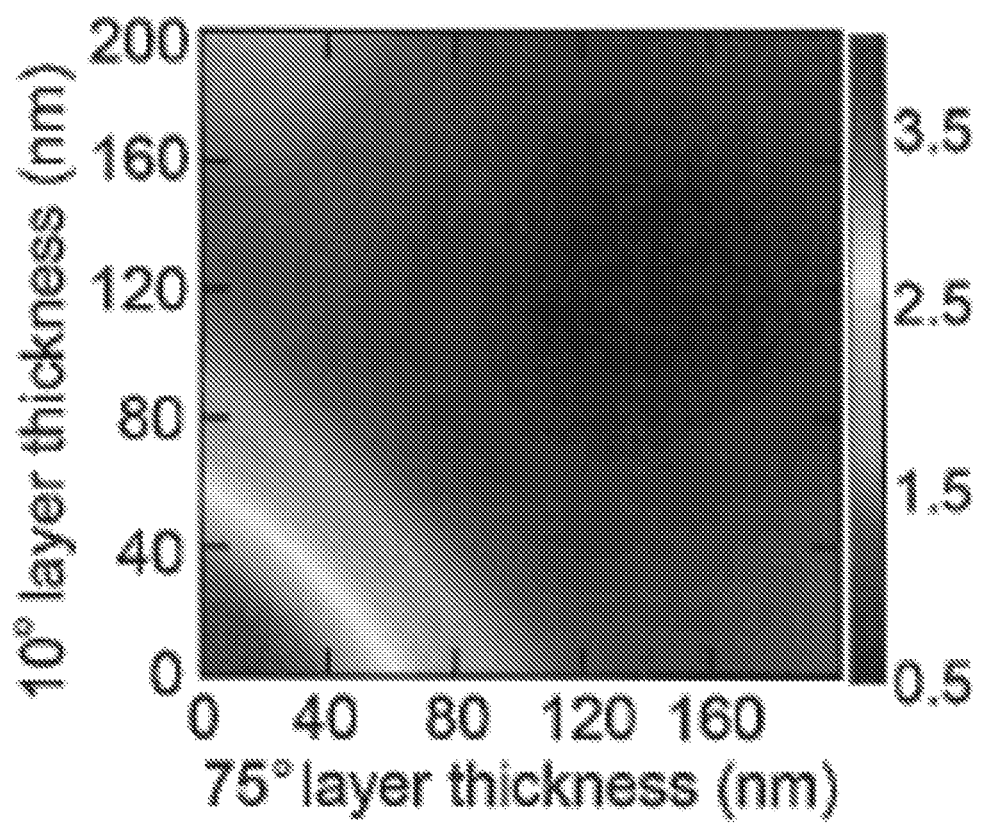
FIG. 4 is a false color plot showing the solar spectrum-averaged reflectivity predicted for an embodiment of a bilayer AR coating on an embodiment of an acrylic plastic substrate as a function of its constituent GLAD Teflon AF layer thicknesses.

The refractive index range shown in FIG. 2 may facilitate generation of ideal single layer and/or near-ideal double layer quarter wave AR coatings for acrylic (polymethylmethacrylate, $n_{PMMA}$=1.49) substrates and/or polycarbonate ($n_{PC}$=1.58) substrates. A double layer coating embodiment may be a practical compromise between complexity and performance for solar concentrator applications, for example. For instance, FIG. 4 shows the solar spectrum-averaged reflectivity (400<λ<1600 nanometers) at normal incidence predicted for a coating composed of α=10° ($n_{10°}$=1.31) and α=75° ($n_{75°}$=1.17) GLAD generated layers with varying thickness on an acrylic substrate. Targeting the broad reflectivity minimum displayed in the contour plot of FIG. 4, a bilayer coating may be subsequently deposited on an acrylic substrate with thicknesses $t_{10°}$=114±2 nanometers and $t_{75°}$32 135±2 nanometers determined via ellipsometry.

Figure 5:
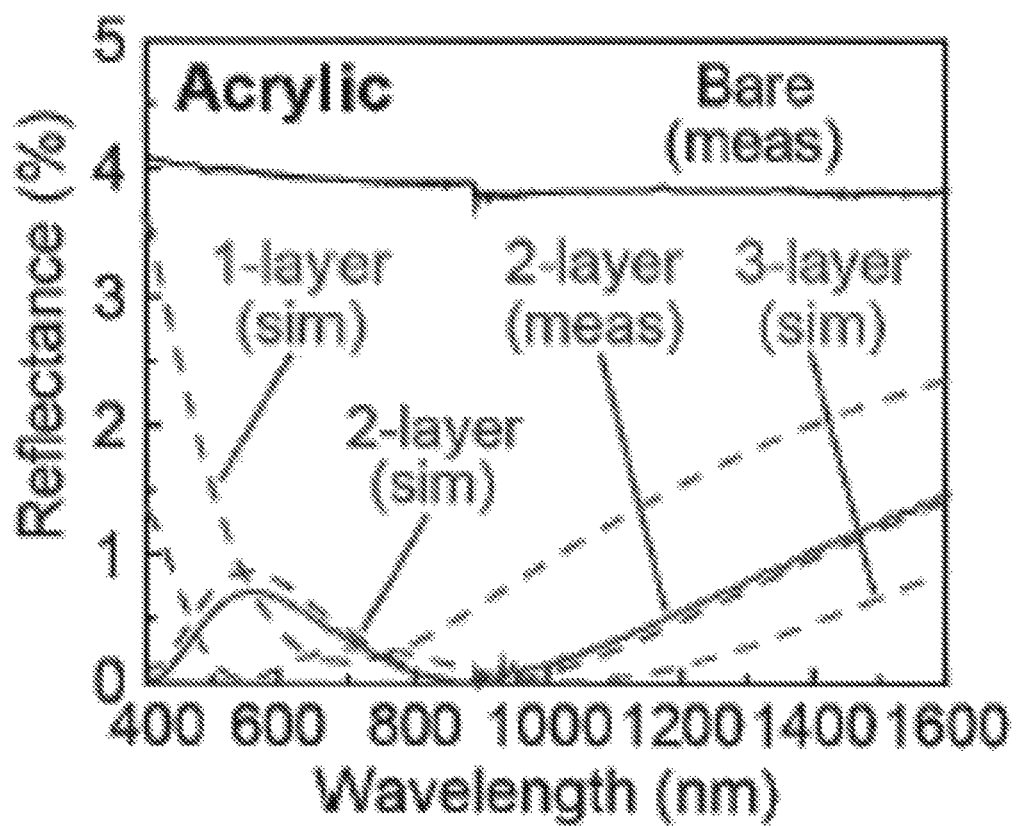
FIG. 5 shows a single-surface reflectivity spectra measured at $\theta=8°$ incidence for an embodiment of a bare acrylic plastic (black solid line) substrate and an embodiment of a bilayer AR coated acrylic substrate. The dashed lines show the reflectivity that may be predicted for the bilayer coating together with single and trilayer antireflective (AR) coatings for reference.

FIG. 5 shows the resulting single side reflectance spectrum measured at θ=8° incident angle that may be achieved by roughening a back side of the substrate and painting it black. This result agrees well with the model prediction (blue dashed line). This may lead to an $R_{avg}$=0.42±0.05%, which is nearly an order of magnitude lower than $R_{avg}$≈3.8% for the bare acrylic surface (solid black line). Model predictions for ideal single and triple layer AR coatings (red and green dashed lines, respectively) are included in FIG. 5 to convey the diminishing marginal improvement in AR performance that may be experienced with increasing the number of layers of the formed coating beyond two layers.

Figure 6:
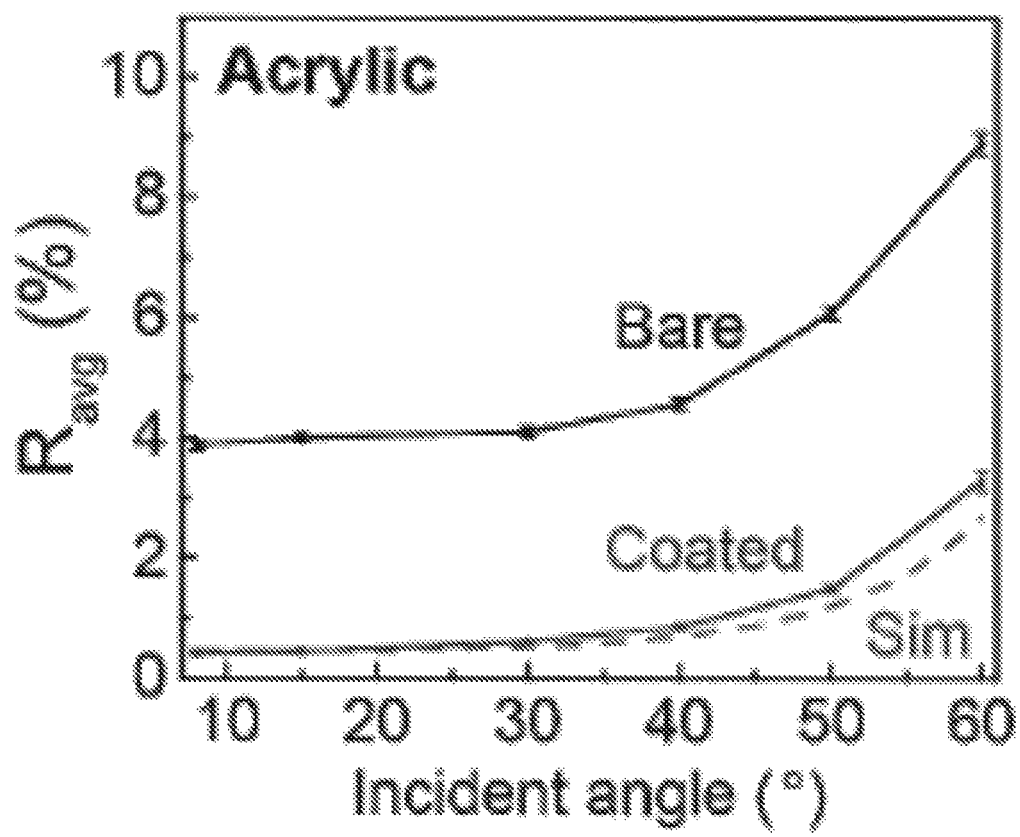
FIG. 6 shows the angle dependence of the solar spectrum-averaged reflectivity of a bare acrylic substrate and an exemplary embodiment of a bilayer AR coated acrylic substrate coated via an exemplary embodiment of the coating process for coating a polymeric substrate with an AR coating.
Figure 7:
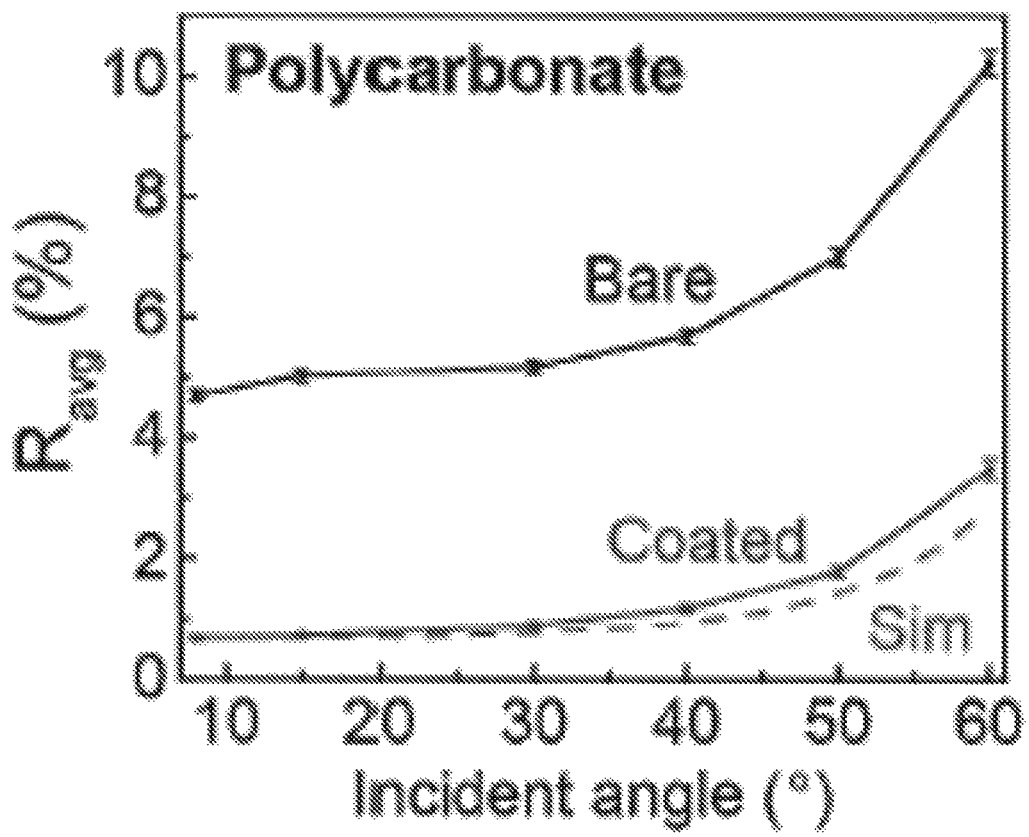
FIG. 7 shows the angle dependence of the solar spectrum-averaged reflectivity of a bare polycarbonate substrate and an exemplary embodiment of a bilayer AR coated polycarbonate (PC) substrate coated via an exemplary embodiment of the coating process for coating a polymeric substrate with an AR coating.

FIGS. 6 and 7 show the angle dependence of $R_{avg}$ for bilayer AR coatings applied to acrylic and polycarbonate substrates, respectively. In both cases, the average reflectivity can be strongly suppressed relative to the bare substrate at all angles, maintaining $R_{avg}$<1% up to θ=40° incidence angle and $R_{avg}$<3.5% up to θ=60°. This may be indicative of good broadband, omnidirectional AR performance for acrylic and polycarbonate substrates when coated with an embodiment of the coating via an embodiment of the process for forming the coating on the outer surface of the substrate.

Figure 8:
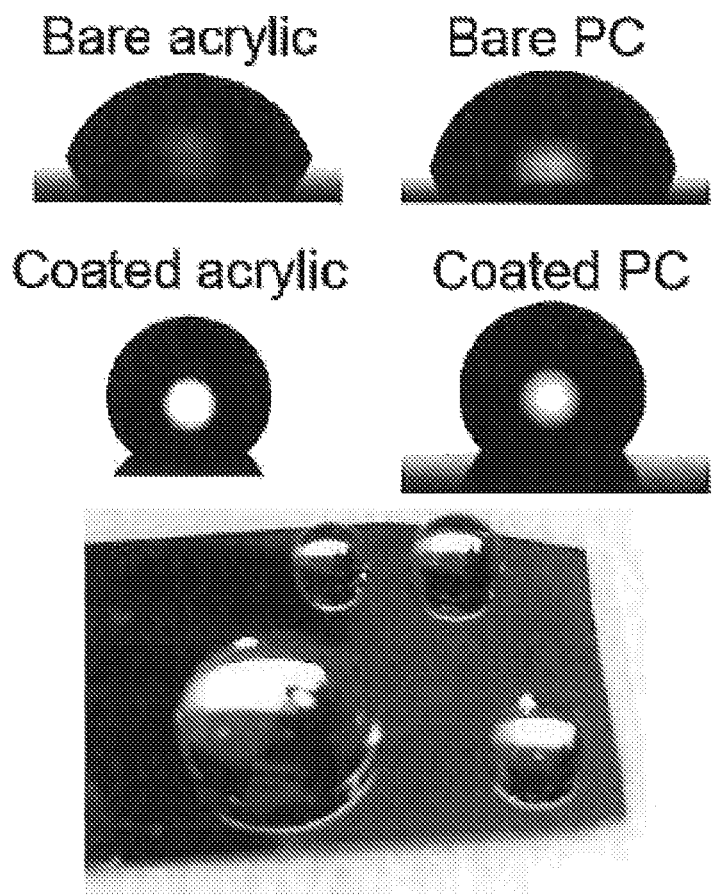
FIG. 8 shows photographs of the water contact angle on an embodiments of a bare acrylic substrate and a bare polycarbonate substrate versus exemplary embodiments of an AR coated acrylic substrate and an AR coated polycarbonate substrate, which reach $\theta_c=141°$ and $\theta_c=140°$, respectively. The bottom photograph shows water droplets on an embodiment of an AR coated silicon wafer. The AR coatings of the substrates were coated via an exemplary embodiment of the coating process for coating a polymeric substrate with an AR coating.

Embodiments of the coating can include a GLAD generated fluoropolymer coating formed on an outer surface of a polymeric substrate. This may facilitate generating a hydrophobic nanoporous coating for some embodiments. For example, a coating may be formed that can exhibit a high water contact angle of approximately 140° on acrylic and polycarbonate substrates, as shown in FIG. 8. Embodiments of the coating formed via an embodiment of the coating process may be formed on substrates composed of other types of material, such as, for example, other types of polymeric material or plastic material.

Figure 9:
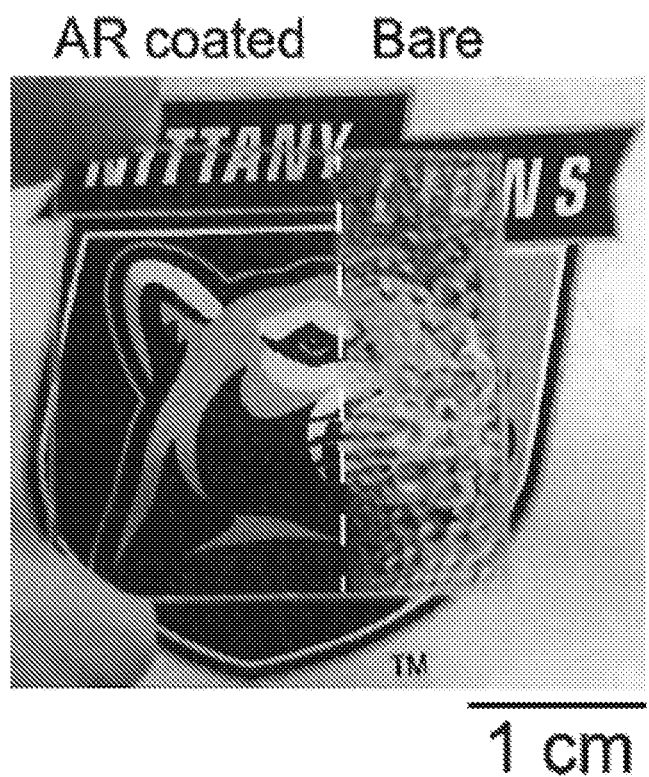
FIG. 9 shows a photograph demonstrating an exemplary anti-fogging behavior of an exemplary embodiment of the AR coating applied to half of an exemplary embodiment of an acrylic substrate that has been cooled below the ambient dewpoint. The AR coating of the substrate was coated via an exemplary embodiment of the coating process for coating a polymeric substrate with an AR coating.

Some embodiments of the process for forming the coating can be used to generate coatings with antifogging behavior, as demonstrated in the photograph of FIG. 9. FIG. 9 shows a photograph demonstrating an exemplary anti-fogging behavior of an embodiment of the AR coating applied to half of an acrylic substrate that has been cooled below the ambient dewpoint. In some embodiments, GLAD processing can be utilized to form AR coatings that can exhibit chemical compatibility of a fluoropolymer (e.g., Teflon™) used to make the coating. For example, a bilayer AR coated acrylic substrate embodiment can be configured to withstand pools of harsh organic solvents such as toluene, xylene, and chlorobenzene on their surface for up to 5 minutes with no deterioration.

Strong fluoropolymer adhesion to acrylic and polycarbonate substrates can be obtained by use of embodiments of the process for providing a coating on a substrate. For instance, embodiments of substrates having fluoropolymer coatings applied thereto via an embodiment of the process have been found to be able to withstand multiple "sharp pull" scotch tape tests and remain intact with no degradation in AR performance after sonicating in water and isopropyl alcohol for one hour. Abrasion resistance may be evaluated by pulling a cheese cloth across a bilayer AR-coated acrylic substrate surface, weighted to deliver a set pressure as outlined in Military Specification (MIL-SPEC) and International Organization for Standardization (ISO) standards. At pressures less than ~10 kiloPascals (kPa), only slight surface scratching may be evident under the view of a microscope from a performance of such testing on embodiments of a coating substrate that had an AR coating applied by use of an embodiment of the process. Further, there may be a negligible increase in solar spectrum-averaged reflectivity (less than 0.03%). Surface damage and reflectivity change may become evident for pressures greater than 25 kiloPascals (kPa).

Figure 10:
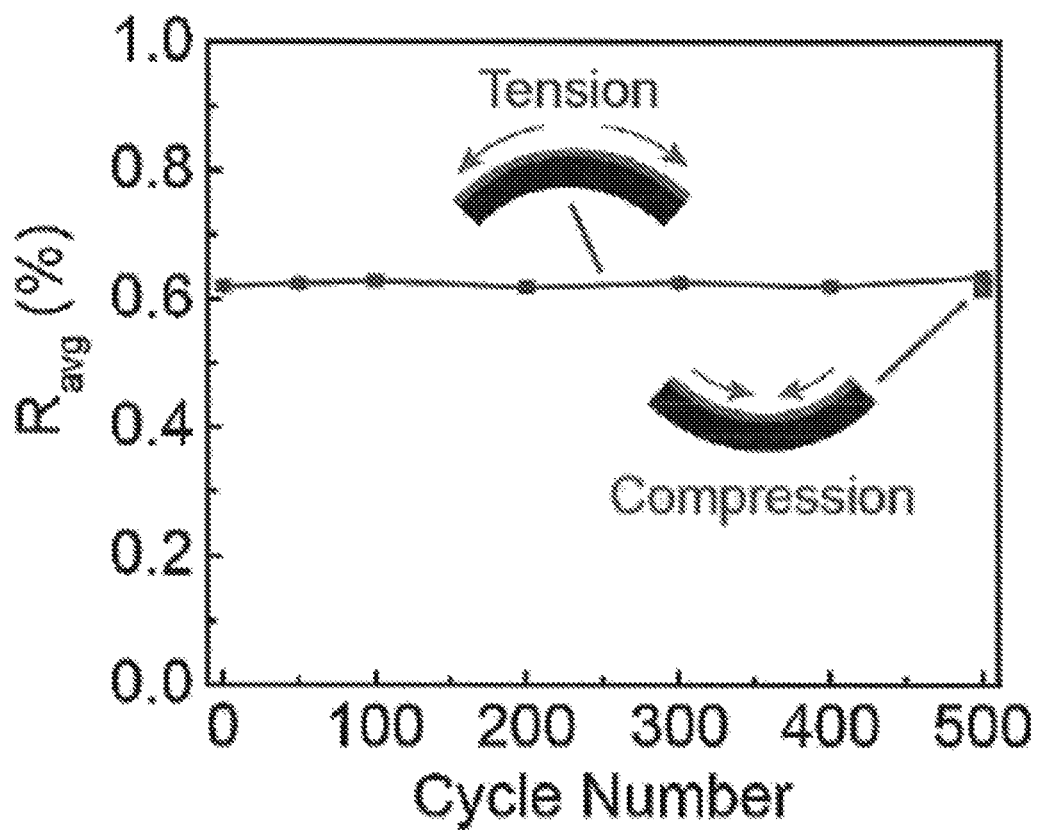
FIG. 10 shows the solar spectrum-averaged reflectivity of an exemplary embodiment of a 75 micrometer thick, AR coated acrylic substrate that may be bent in tension and compression around a 1 centimeter radius rod.

Fluoropolymer coatings formed via embodiments of the process may also be flexible. In addition, fluoropolymer coatings formed via an embodiment of the process can be configured to withstand the stress and strain of extensive bend/compression cycling as shown in FIG. 10. For example, no statistically significant change in reflectance may be observed for an embodiment of a bilayer AR coated, 75 micrometer thick acrylic substrate that had its coating applied via an embodiment of the process in which the embodiment of the coated substrate was flexed in both tension and compression around a 1 centimeter radius rod over the course of 500 cycles.

Figure 11:
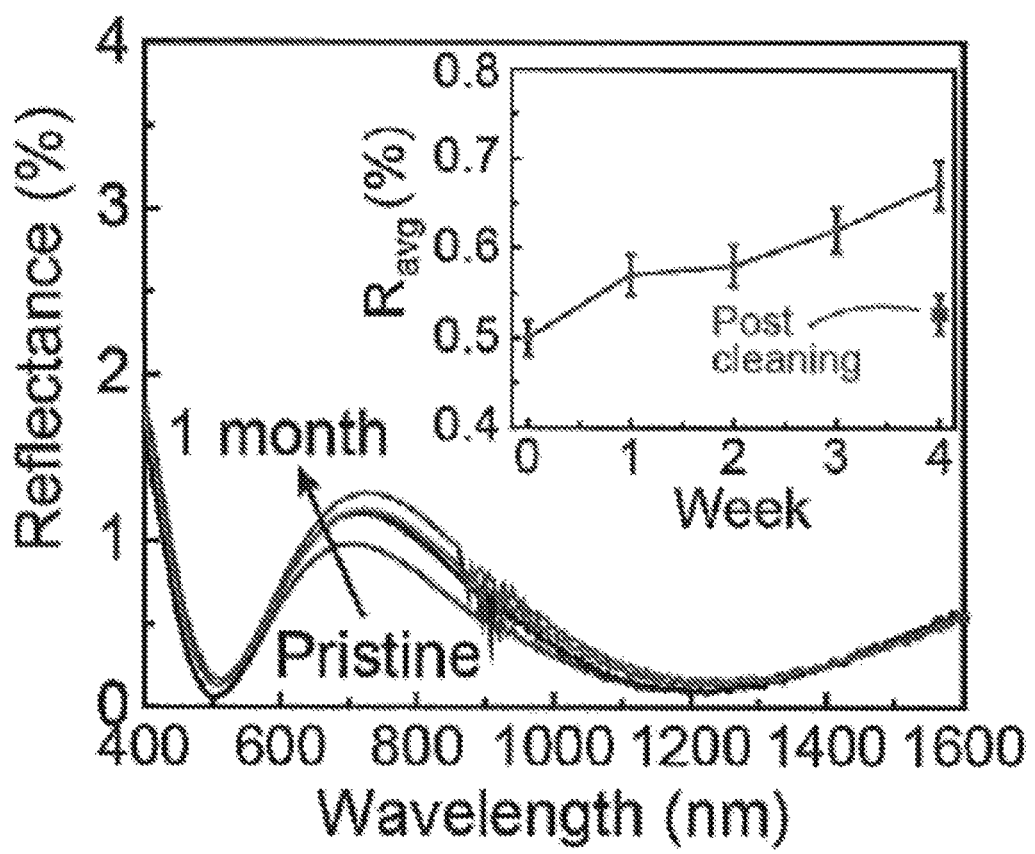
FIG. 11 shows a single-surface reflectivity spectra of an exemplary embodiment of an AR-coated acrylic substrate measured at weekly intervals over the course of one month of rooftop summer outdoor exposure in central Pennsylvania. The inset shows the solar spectrum-averaged reflectivity over time. The sample was mounted 30 centimeters above the rooftop shingles at latitude tilt, facing south and was not be cleaned prior to any of the measurements except the last measurement.

Environmental stability for embodiments of a coating substrate coated via an embodiment of the process was evaluated through indoor damp heat testing, ultraviolet exposure, and/or outdoor rooftop testing. Damp heat testing at 85° Celsius (C) and 85% relative humidity (RH) for ten days revealed no change in AR performance for embodiment of AR coated acrylic substrates having the AR coating applied by use of an embodiment of the process. Similarly, indoor exposure to intense ultraviolet light from a Xe lamp with a power density of 170 Watts (W)/meter$^2$ (m$^2$) in the 275-375 nanometer (nm) wavelength range (the ultraviolet equivalent of approximately 19 suns) may produce no measurable change in reflectivity after ten days of continuous exposure. FIG. 11 shows the reflectance change recorded over the course of one month for an exemplary embodiment of bilayer-coated acrylic substrate samples ($t_{10°}$=120 nm and $t_{75°}$=170 nm) placed on the rooftop of the Penn State Electrical Engineering East building facing south at latitude tilt during late summer. The slight increase in $R_{avg}$ shown in the inset of FIG. 11 may be the result of the buildup of surface contaminants over time, as samples were not be washed prior to each reflectance measurement. Cleaning with water and isopropanol at the conclusion of the experiment restored $R_{avg}$ to its pristine value.

Figure 12:
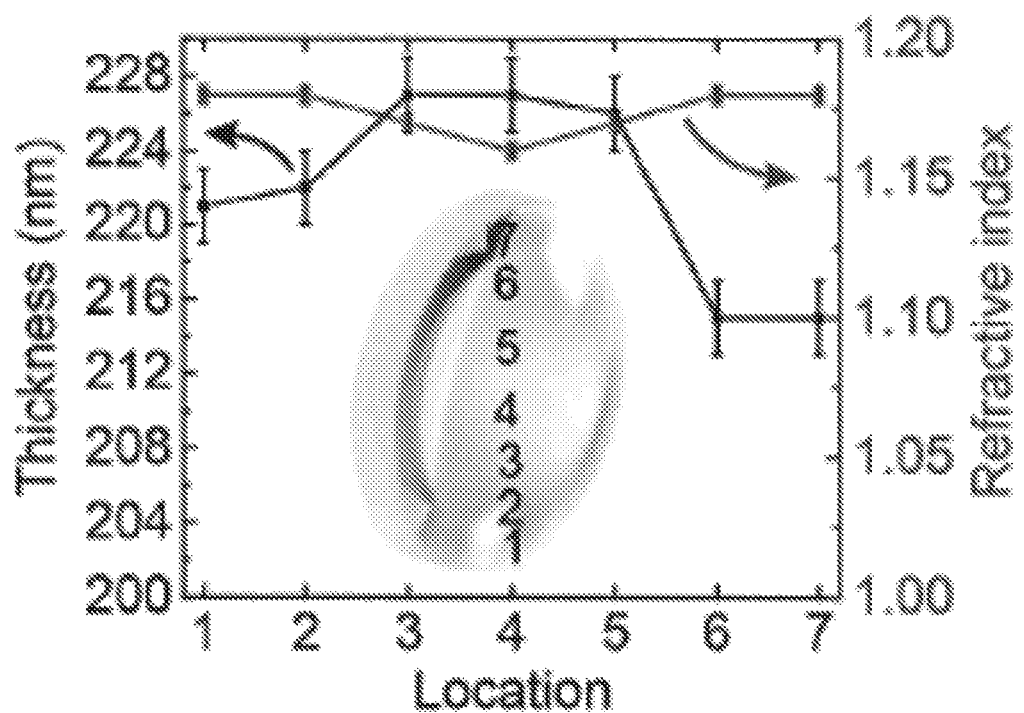
FIG. 12 shows thickness and refractive index uniformities for an exemplary embodiment of a coating configured as an $\alpha=75°$ GLAD generated Teflon AF film deposited on a curved surface of an f/2 plano-convex lens. Data at the locations shown in the inset were acquired via ellipsometry by peeling off a narrow strip of Ag-coated Kapton tape that was adhered across the diameter of the lens surface during deposition.

Thickness and refractive index uniformity of embodiments of the coatings of substrates applied by use of an exemplary embodiment of the coating process were measured. The coating process included a single α=75° GLAD generated coating layer deposited via GLAD onto a narrow strip of Ag-coated Kapton tape draped over the curved side of an f/2 plano-convex lens (25.8 millimeter radius of curvature) while the lens was rotating azimuthally (i.e., about the n̂ direction in FIG. 1 at a rate of 30 revolutions per minute (min). FIG. 12 shows the thickness and refractive index measured via ellipsometry at seven locations along the strip corresponding to the lens surface locations shown in the inset. Both the thickness and refractive index vary by less than 4% relative to the mean, which is expected to have a negligible impact on AR performance based on the large tolerance associated with the reflectivity minimum in FIG. 4.

Figure 13:
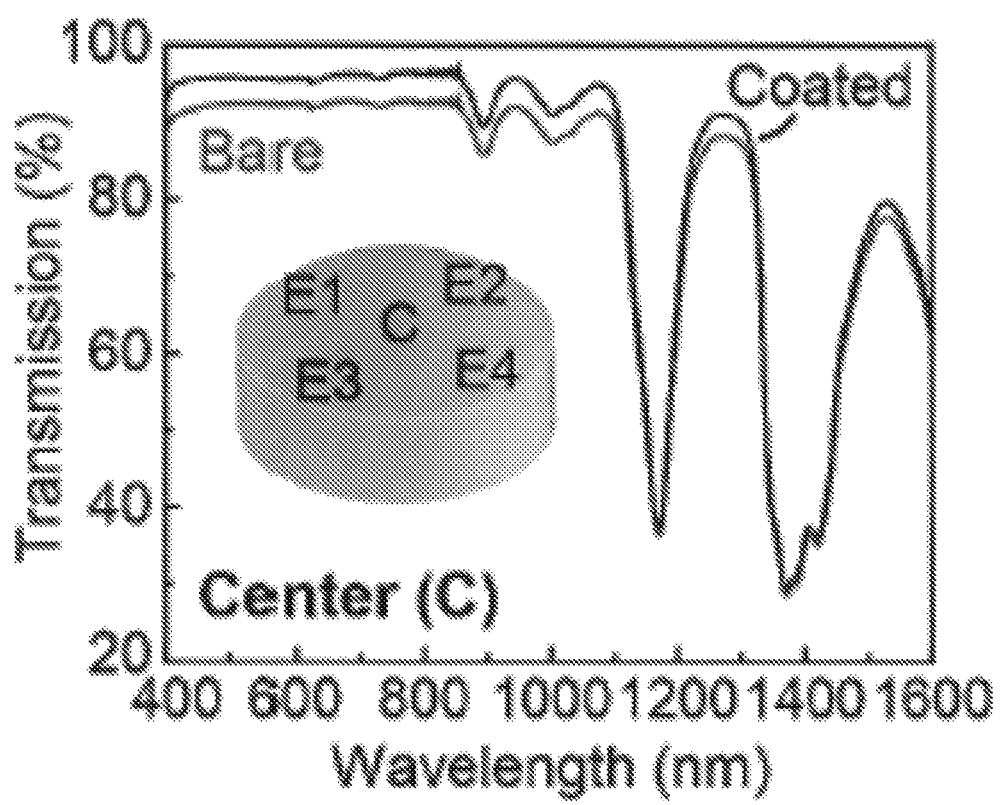
FIG. 13 shows transmission spectra measured through the center of a bare f/1 reciprocal focal length plano-convex acrylic lens and transmission spectra measured through the center of an exemplary embodiment of a bilayer AR coating applied to a curved surface of a f/1 reciprocal focal length plano-convex acrylic lens.
Figure 14:
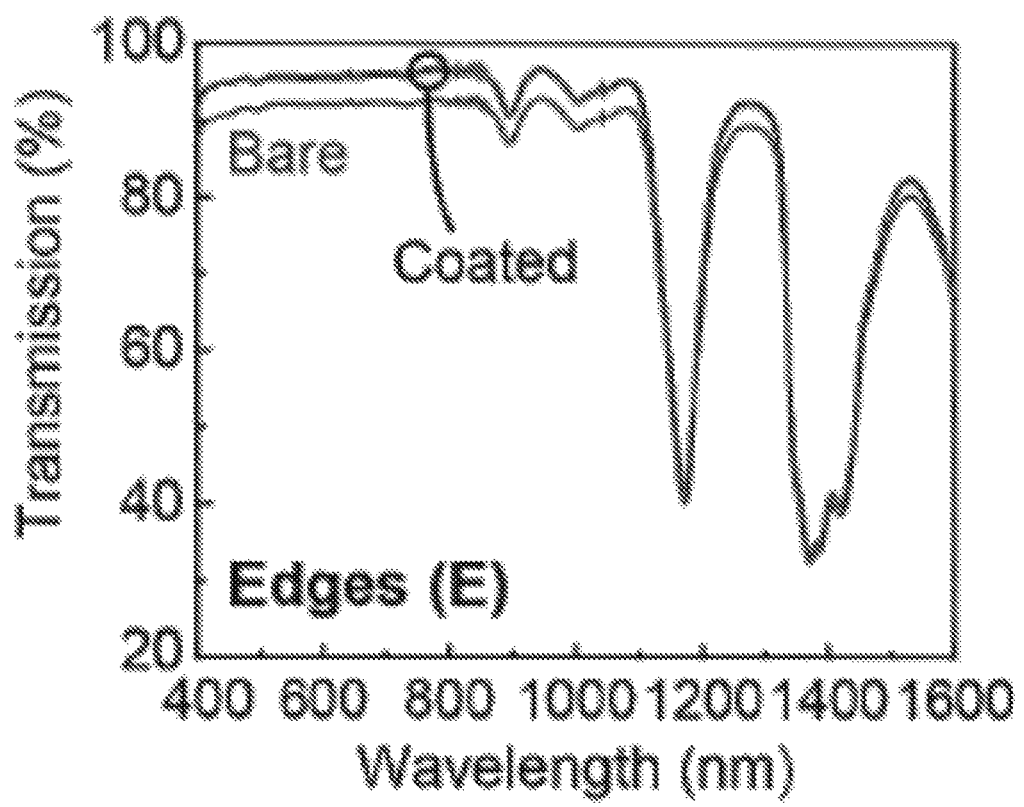
FIG. 14 shows transmission spectra data obtained at four locations near the perimeters of the lenses described in FIG. 13. Transmission spectra may be measured with an integrating sphere detector. Transmission spectra may be unaffected by lens refraction. Slight differences in the bare lens transmission between FIGS. 13 and 14 may arise from the different path length for absorption between the center and edge locations.
Figure 15:
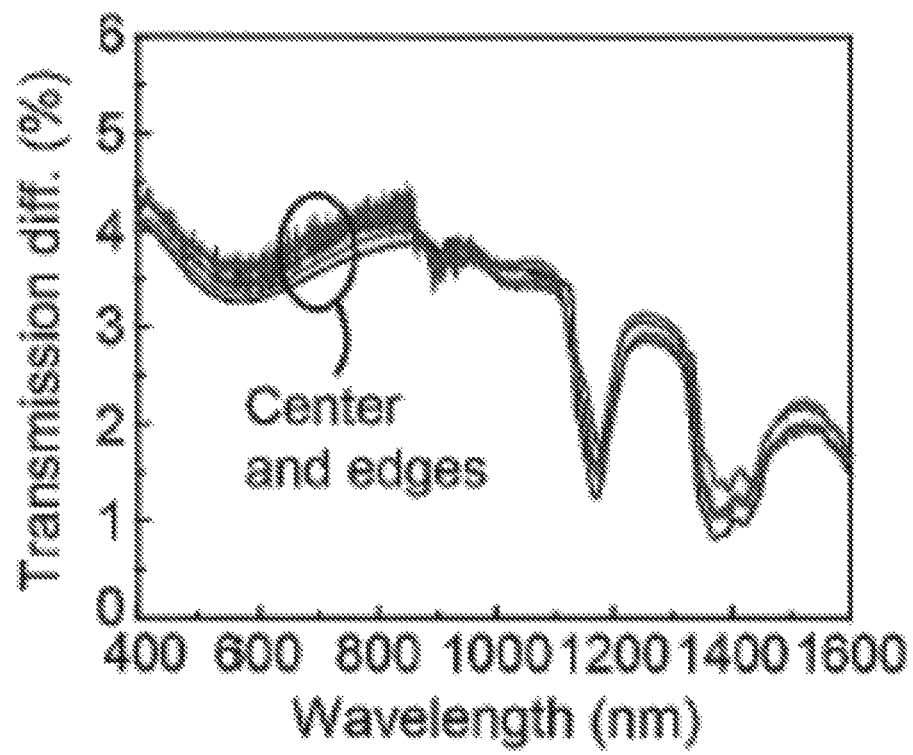
FIG. 15 shows the difference between the AR coated and bare lens transmission spectra shown FIGS. 13 and 14, demonstrating near identical AR performance at the different measurement locations.

Direct transmission measurements on an f/1 reciprocal focal length acrylic plano-convex lens (12.5 millimeters radius of curvature) with an exemplary embodiment of a bilayer AR coating deposited on its curved surface applied via use of an embodiment of the coating process show that the coating can provide a uniform AR performance throughout the entirety of the coated surface. FIGS. 13 and 14, respectively, show the transmission spectra measured (using an integrating sphere detector) at the center and four edge locations of both bare and AR coated lenses. As highlighted in FIG. 15, the transmission difference between the AR and bare lenses may be largely independent of the measurement location. Because the transmission difference can be approximately equal to the reflectivity reduction of the AR coated curved surface when absorption in the lens bulk is negligible (e.g., for $\lambda$<1100 nanometers), the close overlay of the data in FIG. 15 may be used to confirm that the AR coating functions uniformly over the entire f/1 curved surface. Performing the same experiment on an f/4 reciprocal focal length lens (49.8 millimeter radius of curvature) may result in a similar conclusion.

Figure 16:
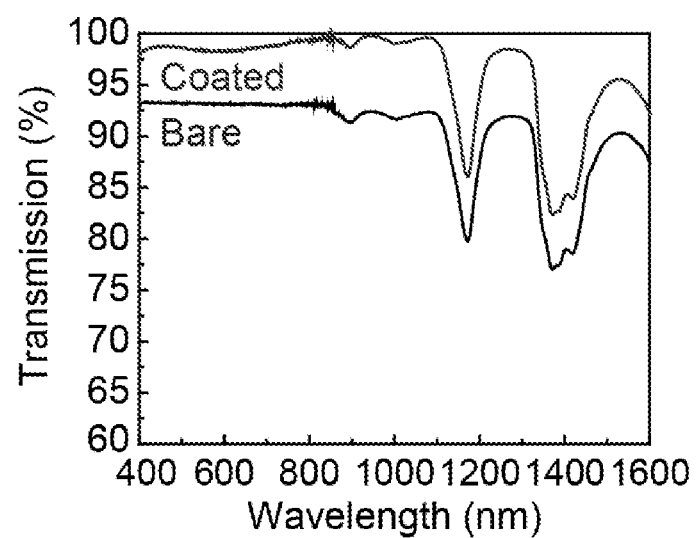
FIG. 16 shows the transmission spectra measured through a bare f/2 reciprocal focal length acrylic Fresnel lens and transmission spectra measured through a f/2 reciprocal focal length acrylic Fresnel lens having an exemplary embodiment of a bilayer AR coating applied to both sides of the lens.
Figure 17:
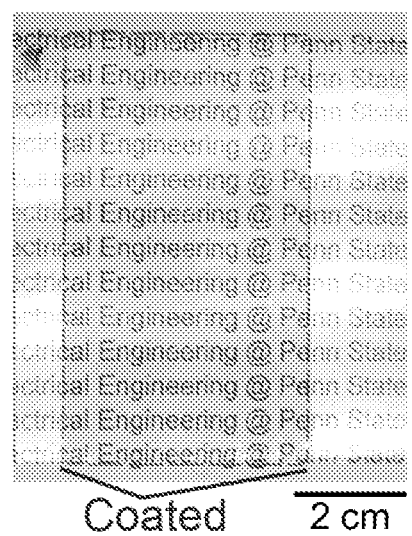
FIG. 17 shows a photograph of an exemplary embodiment of a partially AR coated acrylic Fresnel lens, where the reflection of the fluorescent room lights can be strongly suppressed in the coated region indicated by the red dashed rectangle.

FIG. 16 presents a direct application demonstration relevant to concentrating photovoltaics. In this case, an exemplary embodiment of a bilayer AR coating applied to a substrate via an embodiment of the coating process was deposited on both sides of a 6.3×6.3 cm$^2$, f/2 reciprocal focal length acrylic Fresnel lens with a groove density of 49 cm$^{-1}$. FIG. 16 compares the transmission spectrum of a coated and uncoated lens, confirming an extraordinary broadband improvement that may be achieved. This can increase the solar spectrum-averaged transmittance from $R_{avg}$=92.0% to $R_{avg}$=98.1%. The AR performance may also be visually apparent by eye as shown in FIG. 17, where the reflection of fluorescent room lights in a selectively-coated region of the Fresnel lens (denoted by the red dashed line) may be strongly suppressed. All-together, after AR coating more than 25 different lenses over the span of several months in a related solar concentrator effort, these results were found to be very reproducible.

Embodiments of the AR coatings formed via embodiments of the process were also found to perform well on glass substrates, but the adhesion may be weaker as compared to polymeric substrates. It is contemplated that this issue can be addressed by first treating the glass substrate surface with a fluorosilane coupling agent to promote adhesion with a fluoropolymer coating. However, investigations suggest that the polymer chains may cleave into fragments between adjacent dioxole rings during the evaporation process and subsequently repolymerize on the target substrate. This is consistent with an increase in background chamber pressure (from ~10$^{-7}$ Torr up to ~10$^{-6}$ Torr) that was observed during each deposition cycle of an embodiment of the process. This also indicates that the strong adhesion of evaporated Teflon AF can be induced onto the outer surface of various polymeric substrates (e.g. not just acrylic and polycarbonate substrates) since these small molecule fragments induced via vaporization of a fluoropolymeric material may diffuse into the host chain network of the polymeric substrate to some extent before repolymerizing. This induced, primarily mechanical mode of chain interlocking adhesion that can be induced by use of an embodiment of the process in which the fluoropolymeric material is vaporized to cleave fragments of the coating material for subsequent diffusion into the outer surface of a substrate can be configured to occur for a large number of different types of polymeric substrates. For instance, testing results demonstrate strong adhesion to Zeonex 350R and TOPAS COC polymers, which support this conclusion.

Graded-index AR-coatings for acrylic and polycarbonate plastic substrates based on glancing angle-deposited fluoropolymer coatings can offer an extraordinary combination of mechanical, chemical, and environmental durability. For example, simple bilayer AR coatings formed via embodiments of the method of forming an AR coating on a substrate can reduce the solar spectrum-averaged reflectance of an acrylic substrate to less than 0.5% over a wide range of incidence angles. Simple bilayer AR-coatings may be applied to curved lens surfaces and Fresnel lenses alike. Additionally, methods including the disclosed AR coating strategy can be compatible with standard commercial vacuum coating systems to permit relatively easy industrial application of embodiments of the method. It is therefore contemplated that the disclosed methods for forming a coating may find widespread use in the rapidly growing number of applications in which plastic optics are employed.

Embodiments of the AR coating can adhere strongly and deliver durability advantages when applied to optical plastic substrates (such as, acrylic and polycarbonate substrates polyethylene substrates, cyclo olefin polymeric substrates, cyclic olefin copolymeric substrates, Zeonex brand polymeric substrates, TOPAS COC brand polymeric substrates, or another type of polymeric substrate) due to a unique molecular scale diffusion and interlocking process that can be configured to occur with the polymer substrate during utilization of embodiments of the method. For example, FIG. 18 shows that some fluoropolymers, such as Teflon AF, can cleave into fragments upon evaporation that can be induced for subsequently diffusing the fragments into the outer surface of the substrate to a depth below the outer surface and subsequently re-polymerize with the polymeric chain of the substrate. It is contemplated that this can allow the chains of the fluoropolymer to interlock with the substrate polymer chains to deliver outstanding coating adhesion. This is not achievable for other conventional AR coatings for plastics.

As may be seen from FIG. 18, some embodiments of the method can be configured so that a fluoropolymeric source material can be heated such that the material evaporates in a way that cleaves the polymeric material into polymeric chain fragments. These cleaved chain fragments may be directed toward the outer surface of a substrate (or at least a portion of the outer surface) so that the fragments diffuse into the substrate (e.g. diffuse from the outer surface of the substrate to a depth of up to 5 nm, 10 nm, 25 nm, 50 nm, 10-50 nm, 100 nm, 10-200 nm, 350 nm, 500 nm, 750 nm, 1 µm, etc.). Additional fragments can be deposited onto the fragments that have diffused into the outer surface so that the outer surface is coated with at least a single layer of fluoropolymeric fragments. After diffusion of the fragments into the substrate and a buildup of fragments onto the surface of the substrate occurs, the fragments can be re-polymerized so that the fragments that were diffused into the depth of the substrate and at the outer surface of the substrate interlock with the substrate's polymer chains to adhere the fluoropolymeric fragments into the substrate so that a solid fluoropolymeric coating is adhered onto the outer surface of the substrate. This coating may be a single layer on the substrate. A second layer of the coating can be applied by subsequently directing additional evaporated fluoropolymeric fragments onto the single layer coating for adhesion onto the single layer using different deposition process parameters, which may include different substrate temperature, deposition rate, and deposition angle. A third layer of the coating and further subsequent layers of the coating can also be applied by subsequently re-running these steps of the process for adhering further layers of the coating onto an underlying layer. These subsequent layers may be deposited by directing the fluoropolymeric fragments onto the substrate at oblique angles using the GLAD process to achieve layers with low refractive index.

Figure 19:
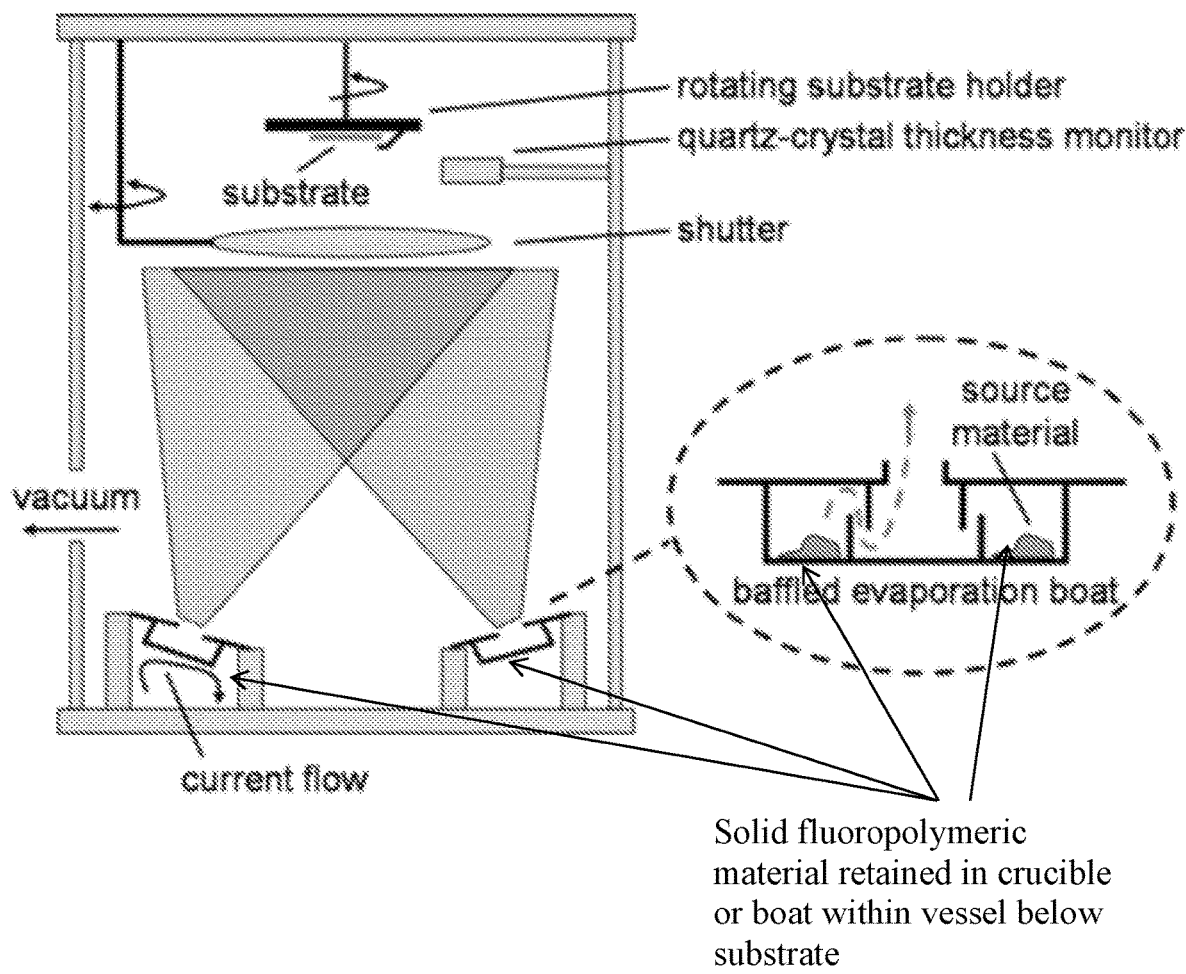
FIG. 19 illustrates an exemplary vessel containing an exemplary substrate and an exemplary crucible or boat for containing solid coating material that is to be subsequently heated for vaporization to deposit a coating layer onto the surface of the substrate via utilization of an exemplary embodiment of our method for coating a substrate.
Figure 20A:
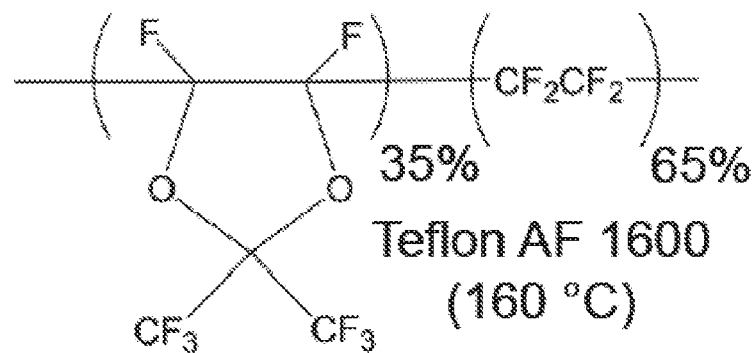
FIGS. 20A-20B show the chemical structures of an embodiment of a mixture that can be used with an embodiment of a selective dissolution process.
Figure 20A:
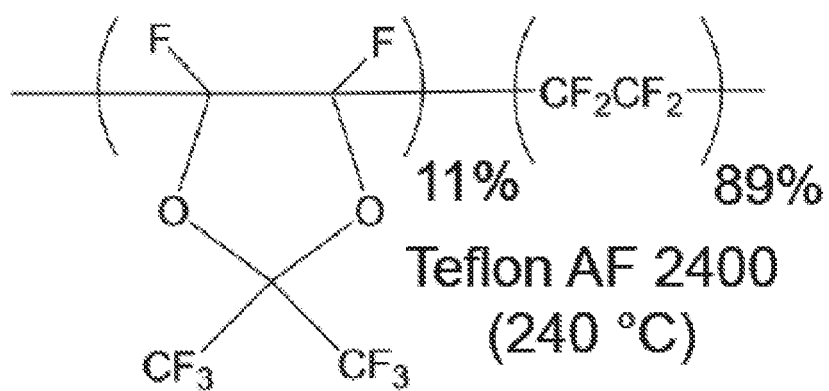
Figure 20B:
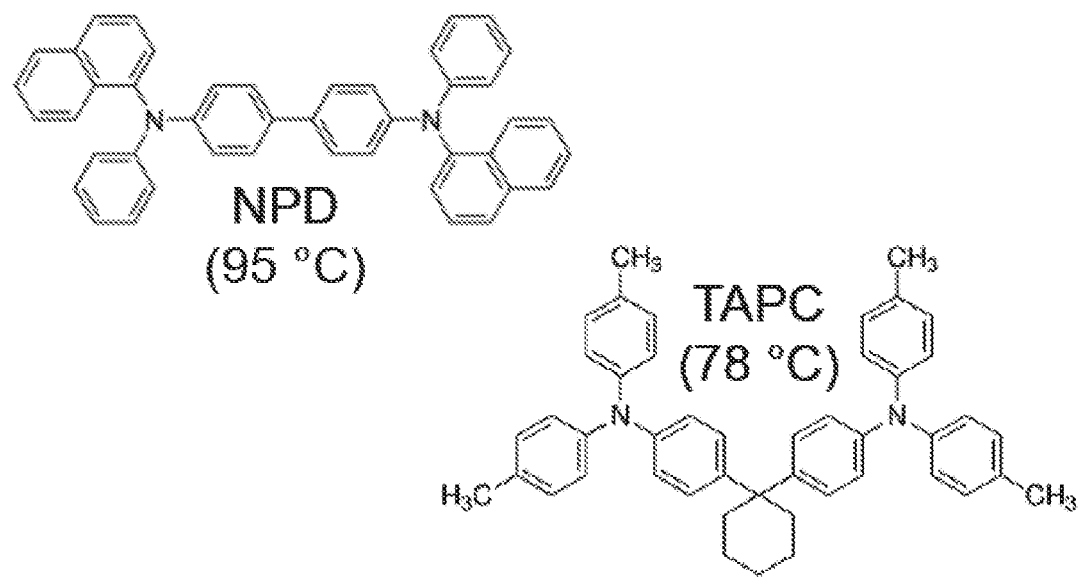

As may be appreciated from FIGS. 18-19, the process used to form the coating can include having a polymeric substrate retained in a vessel, such as a vacuum evaporation chamber. Solid fluoropolymeric material (e.g. powder or particulates of the material having a certain pre-selected size or size range for the solid particulates) can be placed in a crucible or baffled evaporation boat positioned beneath the substrate. The vessel containing the fluoropolymeric material and the polymeric substrate may be placed under vacuum (e.g. a pump or fan connected to the vessel may be actuated to create a vacuum within the vessel) as the crucible or boat containing the fluoropolymeric material is heated to a pre-selected temperature or temperature within a pre-selected temperature range at a pre-selected vacuum pressure in the vessel. The heating of the crucible or the boat can be configured to cause the solid fluoropolymeric material to liquefy and subsequently evaporate so that the fluoropolymeric material is vaporized. In this process, the fluoropolymeric material cleaves into molecular fragments, which are transported to the substrate surface and can subsequently diffuse into the depth of the substrate as other fragments are collected onto the surface of the polymeric substrate. The fragments that diffused into the depth of the substrate can repolymerize, interlocking with the substrate's polymer chains so that a solid fluoropolymeric coating is adhered onto the outer surface of the substrate as the outer fluoropolymeric fragments repolymerize to form the coating on the outer surface of the substrate. It should be understood that the outer surface fragments repolymerize with the diffused fragments so that the diffused fragments are repolymerized with the outer external fragments and are interconnected via repolymerization, as can be seen from FIG. 18.

In some embodiments of the process, a first layer of the coating, which can be considered an adhesion layer, can be deposited at a relatively low rate (e.g. 0.5 nm/s, 0.4 nm/s, 0.2 nm/s, <0.5 nm/s, etc.) onto the polymeric substrate, which itself is heated above ambient temperature. The heated substrate temperature can be selected to be a temperature that can help aid the diffusion of the cleaved molecular fragments of the vaporized, gaseous fluoropolymer into the outer surface of the substrate to a depth within the substrate. It is contemplated that depositing of the fluoropolymeric material at a relatively low rate in combination with the heating of the polymeric substrate provides processing conditions that help facilitate the diffusion of the fluoropolymer molecular fragments into the substrate to occur prior to repolymerizing of the fluoropolymer material in order to maximize chain interlocking adhesion of the coating.

The maximum temperature of the heated substrate can be limited by the glass transition temperature of the polymeric substrate. The heating of the substrate can be provided via a heated substrate holder (e.g. heating a holder of the substrate so that heat may conduct into the substrate) or by another type of heating mechanism such as use of an infrared lamp for radiant heating of the substrate to a pre-selected temperature or a temperature within a pre-selected range of temperatures that may be in the 0-80° C. range or other pre-selected temperature range). In some embodiments, the substrate may be held in a vessel that is configured to facilitate formation of the gaseous fluoropolmer fragments for directing those fragments onto the surface of the substrate while the vessel is under vacuum as may be seen from the exemplary processing system illustrated in FIG. 19. The vessel may be coupled to a conduit that is connected to a fan or pump for providing a vacuum condition for the vessel.

In some embodiments, the temperature of the substrate holder that is heating the substrate may be in the range of 0-120° C. or to a temperature that is above 120° C. (e.g. up to 150° C., up to 200° C., up to 250° C., 120-300° C., 120-400° C., etc.). When a substrate holder is used, the substrate holder temperature is not a direct indication of the actual substrate outer surface temperature due to the typically low thermal conductivity of the polymeric substrate. As an alternative to a substrate holder, radiant heating via an infrared lamp may permit a better control and measurement for the actual temperature of the substrate. As yet another alternative, another type of heating mechanism may be used for heating of the substrate. The temperature to which the substrate is heated may be in the 0-80° C. range or could be in another range to help facilitate (in connection with the deposition rate) a desired amount of diffusion of the fluoropolymer molecular fragments into the substrate. But, other heated temperature ranges can be used to meet a particular set of design criteria and to accommodate for the particular material properties of the polymeric material of the substrate.

After the first layer (which can be considered an "adhesion layer" for a multilayer coating) is deposited, the substrate can be permitted to cool to a desired temperature (e.g. room temperature or another lower temperature) prior to depositing subsequent layers of the coating using different process parameters. This cooling can occur while the vessel retaining the substrate is under vacuum or may occur while the vessel is no longer maintained under vacuum.

In some embodiments, a substrate holder can be cooled to −30° C. or another pre-selected cooling temperature to cool the substrate during the deposition of subsequent fluoropolymeric layers on top of the adhesion layer to achieve layers of a pre-selected thickness or within a pre-selected thickness range onto the surface of the substrate. The substrate holder may be configured to be cooled via a flow of liquid nitrogen that is passed through the substrate holder or it may be cooled via another type of cooling agent (e.g. a refrigerant, etc.). It should be noted that while the substrate holder may be at a particular temperature, the outer substrate surface temperature may be higher than the temperature of the substrate holder. Other cooling mechanisms may alternatively be used instead of using the cooling of a substrate holder to cool the substrate in the substrate holder. For example, the substrate may be cooled by controlling the temperature of the vessel or a temperature inside the vessel. In yet other embodiments, the substrate may be permitted to cool by the cessation of the heating of the substrate for a period of time to let the substrate cool via room temperature conditions.

The substrate may be cooled to a pre-selected temperature to meet a set of design criteria (e.g. material of the substrate, thickness of the coating layer, type of cooling mechanism to be used, etc.). After the substrate has been cooled, a second layer may be deposited onto the adhesion layer. In some embodiments, the coating may only have two layers. But, in other embodiments, a third layer may be formed on the second layer, a fourth layer may be formed on the third layer, and additional layers may be formed on a previously formed layer. Alternatively, a single, continuously graded layer may be formed by continuously varying the substrate deposition angle throughout the deposition process. In yet other embodiments, the first layer (also referred to as the "adhesion layer") may be the only layer and the coating may be fully formed.

When additional layers are deposited onto the first layer, the processing may be the same as the processing used for the first layer (e.g. use of same heating of substrate, deposition rate for fluoropolymer fragments, etc.). In other embodiments, the deposition of additional layers may occur using different processing parameters (e.g. a cooler substrate temperature and a higher deposition rate than the processing of the first layer, etc.). It should be understood that the fluoropolymer fragments (e.g. chain fragments) for subsequent deposition steps may not diffuse into the substrate for these added layers. It is contemplated that the fragments for these additional layers may diffuse into the underlying coating layer or repolymerize on the underlying layer The substrate may be cooled during the deposition of each subsequent layer of the coating. In some embodiments, the cooling of the substrate may be done for each subsequent layer that is formed via the method to provide layers with the lowest possible refractive index.

When using the GLAD process to form the coating, the lowest possible refractive index of subsequent layers deposited on the first layer (also called the "adhesion layer") at an oblique angle can be achieved by depositing evaporated, or vaporized, fluoropolymer at a higher rate for these subsequent layers as compared to the deposition rate used to form the first layer. This can be done to optimize the anti-reflection performance. For instance, the deposition rate for the vaporized fluoropolymer molecular fragments directed to the outer surface of the substrate and/or layer(s) formed on that substrate from a prior deposition step may be 1 nm/s or another deposition rate that is higher than the deposition rate used for depositing the first layer (e.g. a rate that is higher than 0.5 nm/s such as a 0.7 nm/s rate, a 0.8 nm/s rate, a 1.0 nm/s rate, a 1.1 nm/s rate, etc.). In some embodiments, a combination of a higher deposition rate and low substrate temperature for the deposition of additional layers (e.g. second layer, third layer, fourth layer, etc.) can help maximize the layer nanoporosity because it can minimize surface diffusion of fragments and help ensure a sufficient quantity of material arriving at any given moment to rapidly repolymerize and thereby maximize self-shadowed, porous growth morphologies.

As can be appreciated from the disclosure provided herein, a refractive index range from n=1.31 for the fully dense polymer layer down to the ultralow value n=1.17 for GLAD nanoporous films can be achieved. Further optimization of the method and process parameters discussed herein such as, e.g. growing the deposition layer at lower substrate temperature and at faster deposition rates may further decrease the achievable index value. In addition, use of a fluoropolymeric material that may have a lower refractive index when used in connection with the methods disclosed herein, can facilitate an even lower refractive than n=1.17 as described in the examples above.

Referring to FIGS. 20-23, in some embodiments, the coating can be formed via a selective dissolution process. This can include forming an embodiment of the coating on an embodiment of the substrate without the use of GLAD. For example, an embodiment of the process can include forming a layer of material on a surface of an embodiment of the substrate. The layer of material can include a first material and a second material. The first material can be an embodiment of the coating. The second material can be a material capable of being selectively dissolved from within the first material via a solvent.

Figure 21:
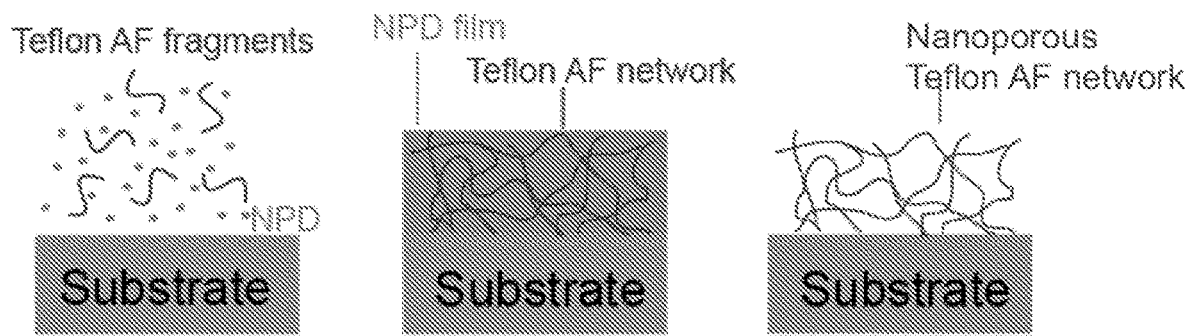
FIG. 21 shows an exemplary co-evaporation process of a coating depicting the co-evaporation, repolymerization, and dissolution steps that can occur in an embodiment of the coating applied to a surface of an embodiment of a substrate.
Figure 22:
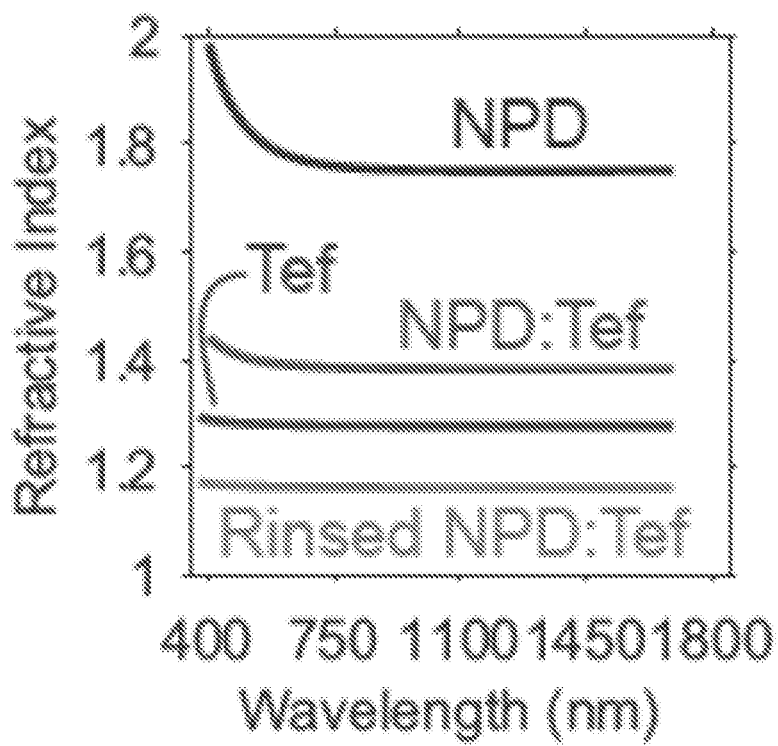
FIG. 22 shows optical dispersion curves of neat 4,4-bis [N-(1-naphthyl-1)-N-phenyl-amino]-biphenyl (NPD) (denoted as "NPD" in the figure), Teflon AF 2400 co-deposited with NPD in a mixture having 75 vol % of Teflon AF 2400 (denoted as "NPD:Tef" in the figure), neat Teflon AF 2400 (denoted as "Tef" in the figure), and the NPD:Tef mixture where the NPD was rinsed out with acetone (denoted as "Rinsed NPD:Tef" in the figure).
Figure 23:
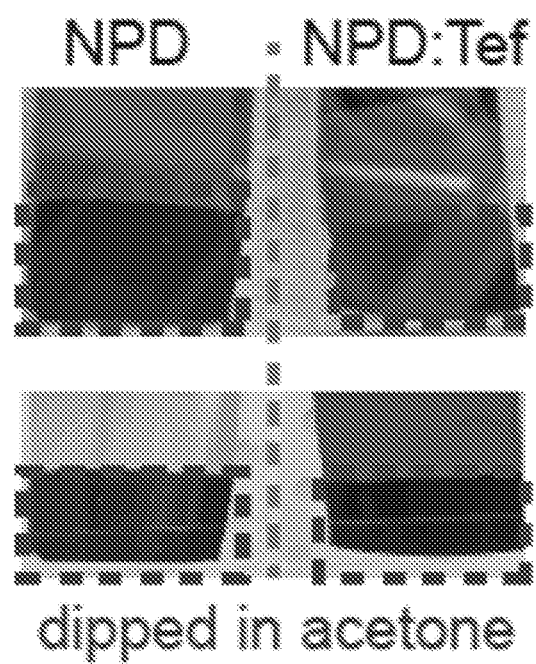
FIG. 23 shows images of films generated by the coatings of FIG. 22. The top left is a picture of a film of NPD in room light. The top right is a picture of NPD:Tef in room light. The bottom left is a picture of NPD under illumination from a 365 nm LED lamp. The bottom right is a picture of NPD:Tef under illumination of a 365 nm LED lamp. The left set of samples correspond to 100 nm NPD deposited onto a silicon substrate, and the right set correspond to 100 nm of 75 vol % NPD:Teflon AF 2400 deposited onto a silicon substrate. The regions boxed in have been dipped in acetone to remove the NPD, leaving behind only Teflon AF 2400 in the bottom right picture.

In at least one embodiment, the first material can be forming on a surface of an embodiment of the substrate via a deposition or evaporation process. FIG. 21 shows an exemplary co-evaporation process of a coating depicting the co-evaporation, repolymerization, and dissolution steps that can occur in an embodiment of the coating applied to a surface of an embodiment of a substrate. The first material can be a fluoropolymer, for example. The deposition or evaporation process can be a co-deposition or co-evaporation process of the first material with a second material. The second material can be a small molecule material (e.g., having a molecular size smaller than that of the first material). The second material can be a material capable of being dissolved by a solvent without the solvent dissolving the first material when in solution. The dissolving of the second material can include removing all of the second material from within the first material. The second material can be 4,4-bis[N-(1-naphthyl-1)-N-phenyl-amino]-biphenyl (NPD), for example. Other second materials can include 4,4'-Cyclohexylidenebis[N,N-bis(4-methylphenyl)benzenamine] (TAPC), N,N'-Bis(3-methylphenyl)-N,N'-diphenyl-benzidine (TPD), or bathophenanthroline (BPhen). The co-deposition or co-evaporation process can occur such that the first material and the second material are vaporized and co-deposited on the surface of the substrate. The first material re-polymerizes to form a continuous, nanoscale polymer chain network. The second material deposited on the surfaced of the substrate can subsequently be selectively removed from the continuous, nanoscale polymer chain network. For example, this can be achieved by using a solvent that dissolves at least a portion of the second material. The solvent can be configured to dissolve at least a portion of the second material, but none of the first material. This can include dissolving at least a portion of the second material, but none of the polymer chain network. The solvent can be a liquid or a gas that contacts the co-deposited first and second materials deposited on the surface of the substrate to remove the second material from the first material. The can be achieved by spraying the substrate having the co-deposited first and second materials with the solvent, by exposing the substrate having the co-deposited first and second materials to the solvent, or by otherwise allowing the substrate having the co-depositing first and second materials to come into contact with the solvent for a predetermined period of time.

Figure 24:
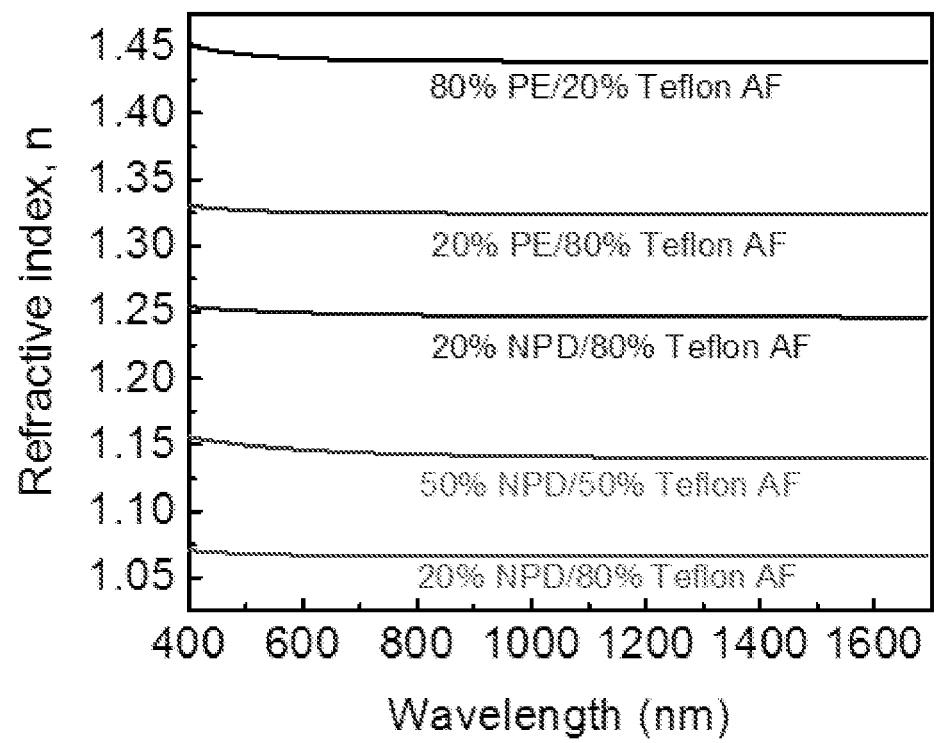
FIG. 24 shows the refractive index of porous Teflon AF films being tuned by changing the NPD fraction to control the porosity.

This may be done to form a nanoporous coating having a refractive index that can be continuously tuned. For example, FIG. 24 shows the refractive index of porous Teflon AF films being tuned by changing the compositions to control the porosity. Films with refractive higher than 1.31 were made by co-evaporating higher index material polyethylene (PE), the PE having a refractive index of n=1.51, with Teflon AF at different ratios.

Figure 25:
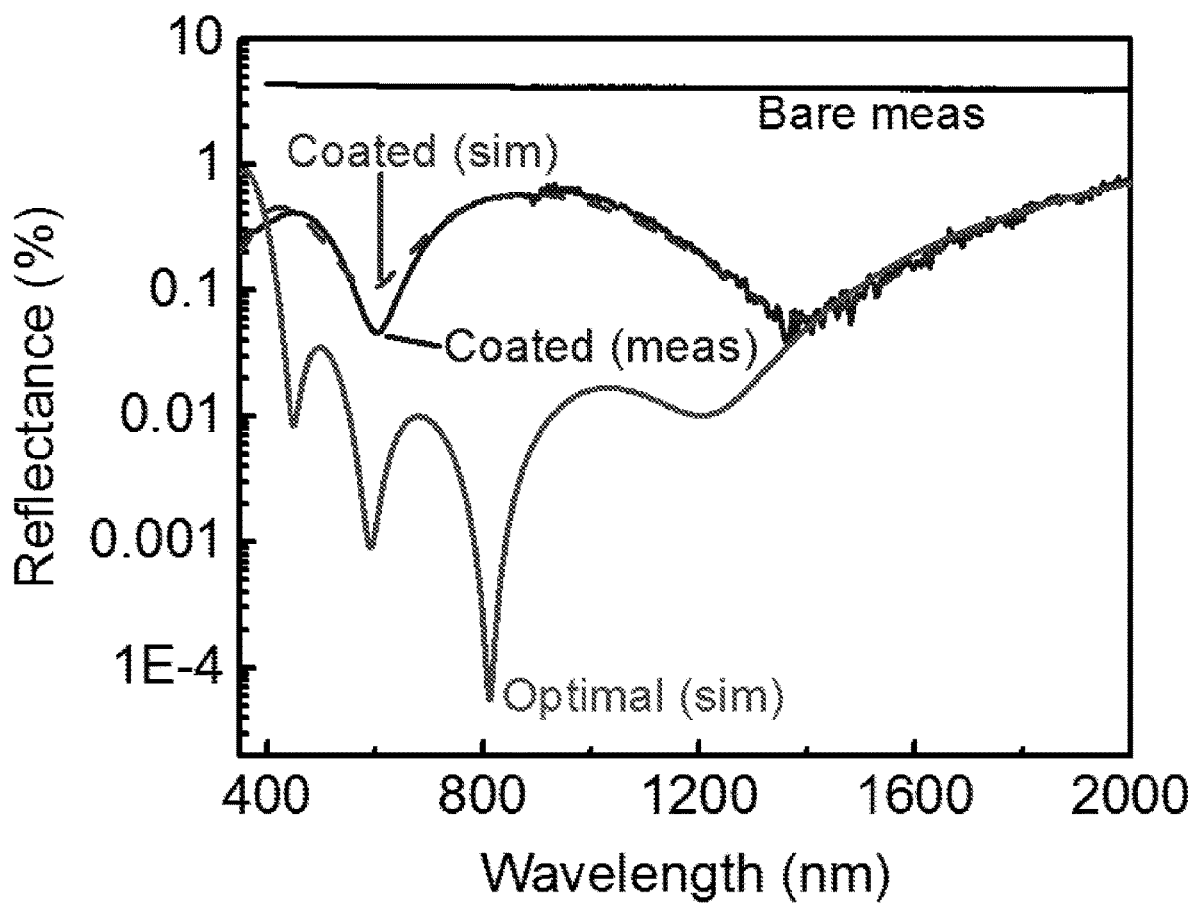
FIGS. 25 and 26 show the spectral and angular performance, respectively, of a six layer linear profile antireflective coating applied on a polymethyl methacrylate (PMMA) substrate using an embodiment of the selective dissolution process.
Figure 26:
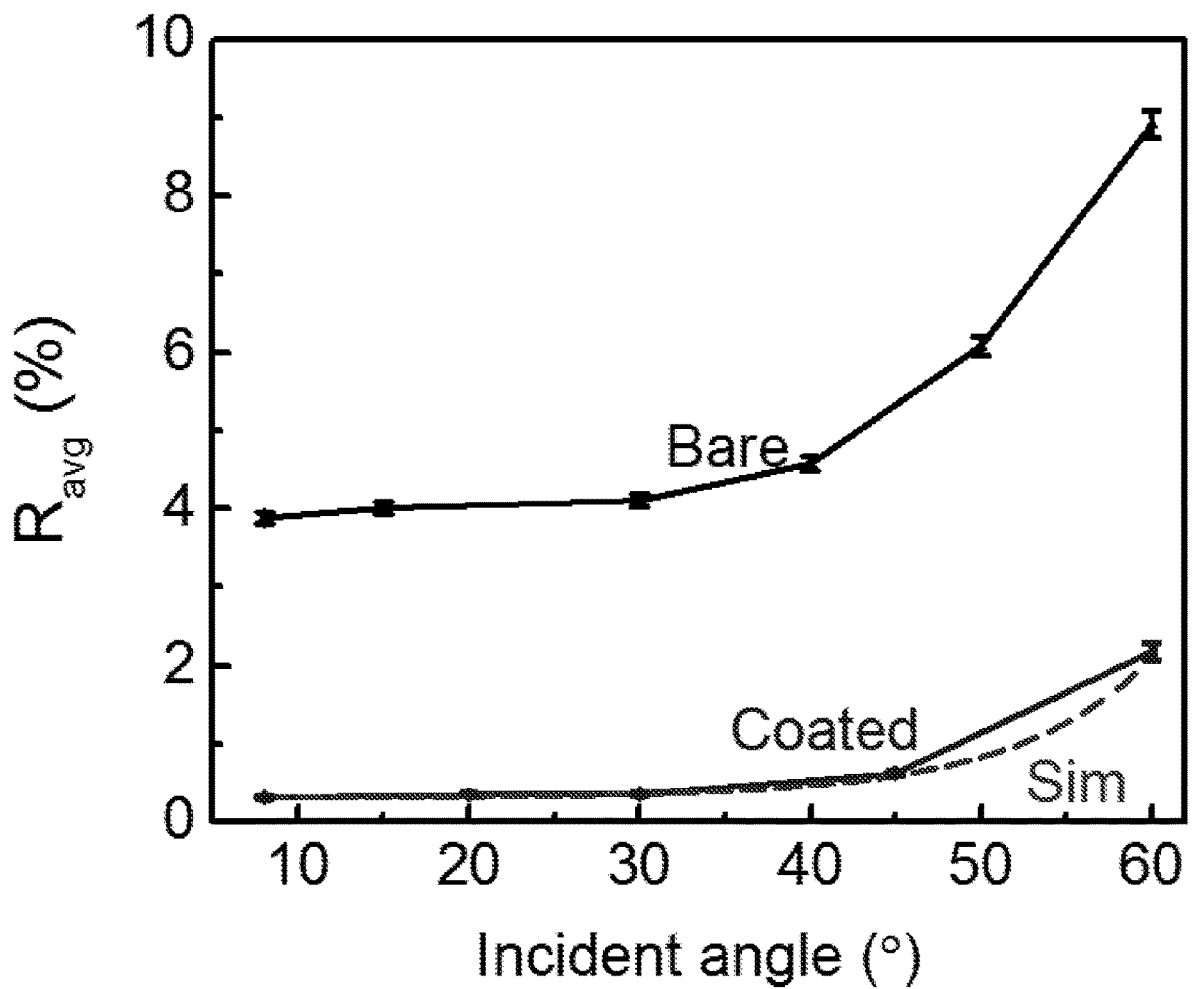
Figure 27:
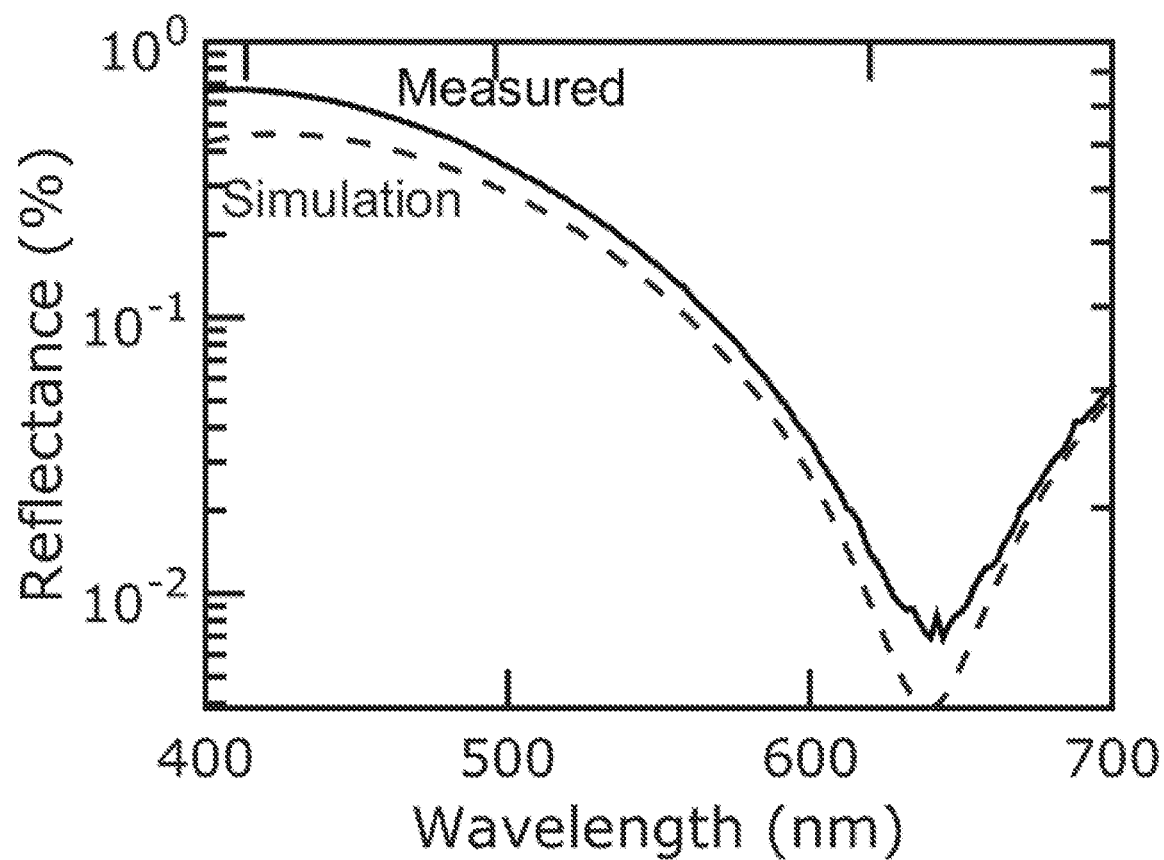
FIGS. 27 and 28 show the spectral and angular performance, respectively, of a two layer antireflective coating created using an embodiment of the selective dissolution process.
Figure 28:
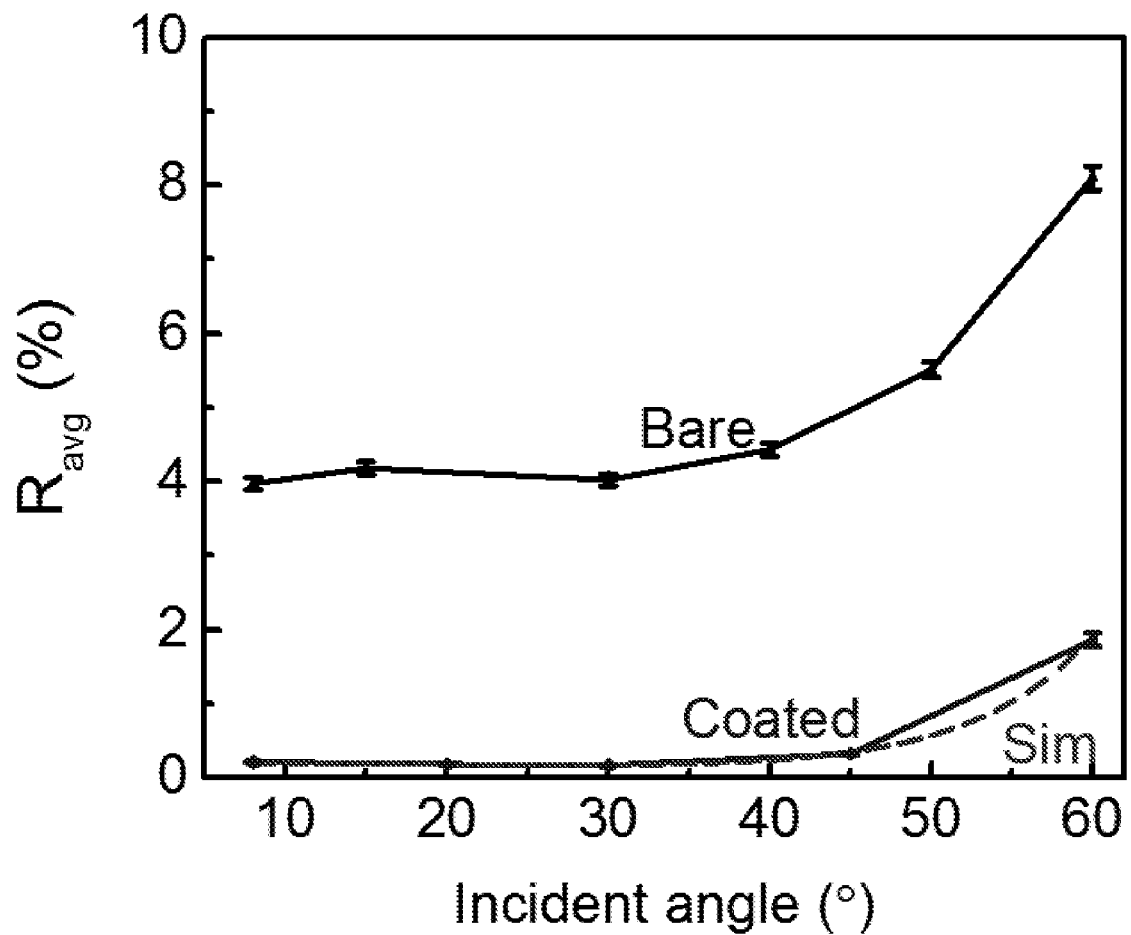

Embodiments of the methods disclosed herein can be used to generate a coating with improved anti-reflection properties. For example, FIGS. 25 and 26 show the spectral and angular performance, respectively, of a six layer linear profile AR coating applied on a polymethyl methacrylate (PMMA) substrate. An approximately 0.3% solar spectrum averaged reflection is achieved over 350 to 2000 nm wavelength range, as shown in FIG. 25. Wide angle antireflection is also achieved, as shown in FIG. 26. FIGS. 27 and 28 show the spectral and angular performance, respectively, of a two layer AR coating created using an embodiment of the selective dissolution process. The coating structure is: Acrylic substrate/80 nm Teflon AF (refractive index n=1.31)/88 nm 1:1 Teflon:NPD blend (n=1.15 when the NPD is dissolved out). $R_{avg}$ is the average reflectivity over the visible spectrum (400-700 nm).

In some embodiments, the first material and the second material can be simultaneously applied onto or into a surface of the substrate. For example, a mixture of the first material and the second material can be co-evaporated onto or into a surface of the substrate. The mixture can include a first vol % of the first material and a second vol % of the second material. Different combinations of first and second vol %'s can be used to make the mixture. The mixture can be applied to form a layer of the mixture on top of at least a portion of the substrate. The mixture can be applied to form a layer of the mixture on top of the substrate with a predetermined thickness. The mixture can be configured such that the second material of the mixture layer can be dissolved by an embodiment of the solvent. The dissolution of the second material can include removing at least a portion of the second material. The dissolution of the second material can include removing all of the second material. For example, dissolving at least a portion of the second material can include removing all or 100% of the second material, removing 95% of the second material (or any percent within a range of 100% to 95%), removing 90% of the second material (or any percent within a range of 100% to 90%), removing 85% of the second material (or any percent within a range of 100% to 85%), removing 80% of the second material (or any percent within a range of 100% to 80%), removing 75% of the second material (or any percent within a range of 100% to 75%), removing 70% of the second material (or any percent within a range of 100% to 70%), removing 65% of the second material (or any percent within a range of 100% to 65%), removing 60% of the second material (or any percent within a range of 100% to 60%), removing 55% of the second material (or any percent within a range of 100% to 55%), removing 50% of the second material (or any percent within a range of 100% to 50%), removing 45% of the second material (or any percent within a range of 100% to 45%), removing 40% of the second material (or any percent within a range of 100% to 40%), removing 35% of the second material (or any percent within a range of 100% to 35%), removing 30% of the second material (or any percent within a range of 100% to 30%), removing 25% of the second material (or any percent within a range of 100% to 25%), removing 20% of the second material (or any percent within a range of 100% to 20%), removing 15% of the second material (or any percent within a range of 100% to 15%), removing 10% of the second material (or any percent within a range of 100% to 10%), removing 5% of the second material (or any percent within a range of 100% to 5%), or removing or any percent within a range of 100% to 0.01%) The second material can be NPD, for example. The solvent can be acetone, isopropanol, tetrahydrafuran, chlorobenzene, toluene, cyclohexane, etc.

A solvent can be used to dissolve or otherwise remove at least a portion of the second material. The solvent may be configured to dissolve the second material but not the first material and not the substrate so that the first material stays deposited on the substrate. In some embodiments, the solvent can be configured to remove at least a portion of the second material from a surface of the substrate and/or the first material. This can include removing at least a portion of the second material to expose a portion of the substrate and/or the first material. The solvent can be acetone, isopropanol, tetrahydrafuran, chlorobenzene, toluene, cyclohexane, etc.

In some embodiments, at least a portion of the substrate including the first material and the second material can be exposed to the solvent. This can include exposing the substrate including the first material and the second material to a predetermined concentration of solvent, for a predetermined amount of time, until a predetermine amount of second material is dissolved or removed, until a predetermined reduction in the second material layer is achieved, until a predetermined reduction in the mixture layer is achieved, etc. In at least one embodiment, at least a portion of the substrate including the first material and the second material can be submerged into a bath of the solvent. The portion of the substrate including the first material and the second material can be submerged into the bath of the solvent for a predetermined amount of time. The portion of the substrate that was submerged can then be removed from the bath of solvent. Some embodiments can include a rinsing or cleaning process to remove any remnant solvent and/or second material.

The resultant substrate with the first material (e.g., the second material being dissolved or removed by the solvent) can have a low refractive index (e.g., as low as n=1.07) because the resultant substrate and/or the first material becomes nanoporous due to the removal of the second material. The refractive index decreases in direct proportion to the degree of nanoporosity. Thus, embodiments of the method can involve a co-evaporation of both the first material and a second material together to create an intimately-mixed blend film. The second material can be a small molecule material. With the use of the solvent, the second material can be a sacrificial small molecule material. During the co-evaporation process, the polymer fragments of the first material can re-polymerize to form a polymer chain network in the blend film. The sacrificial second material can then be removed by selectively dissolving it out with the solvent to leave only a polymer chain scaffold of the first material. This polymer chain scaffold can be a nanoporous film formed on the substrate. The nanoporous film can be mostly air via the removed second material, and therefore can have a very low refractive index. By varying the volume fraction of the sacrificial second material, there is more or less void space left and therefore the refractive index can be tuned continuously. (See FIG. 24).

Referring back to FIGS. 22-23, results of a fluoropolymer coating of Teflon AF 2400 formed on at least a portion of a substrate using an embodiment of the selective dissolution process are disclosed. The substrate used was composed of silicon. A first substrate was coated with a 100 nm layer of neat NPD. A second substrate was coated with a 100 nm layer of a mixture including Teflon 2400 and NPD by the Teflon 2400 and NPD mixture being co-evaporated onto a surface of the substrate. The mixture included 25 vol % NPD co-evaporated with 75 vol % Teflon 2400. It should be noted that Teflon with other molecular weights (e.g., Teflon 1300, Teflon 1600, etc.) can be used. It should also be noted that other volume percents of Teflon 2400 and NPD to form the mixture can be used. These can include, but are not limited to:

5 vol % NPD co-evaporated with 95 vol % Teflon 2400
10 vol % NPD co-evaporated with 90 vol % Teflon 2400
15 vol % NPD co-evaporated with 85 vol % Teflon 2400
20 vol % NPD co-evaporated with 80 vol % Teflon 2400
25 vol % NPD co-evaporated with 75 vol % Teflon 2400
30 vol % NPD co-evaporated with 70 vol % Teflon 2400

35 vol % NPD co-evaporated with 65 vol % Teflon 2400
40 vol % NPD co-evaporated with 60 vol % Teflon 2400
45 vol % NPD co-evaporated with 55 vol % Teflon 2400
50 vol % NPD co-evaporated with 50 vol % Teflon 2400
55 vol % NPD co-evaporated with 45 vol % Teflon 2400
60 vol % NPD co-evaporated with 40 vol % Teflon 2400
65 vol % NPD co-evaporated with 35 vol % Teflon 2400
70 vol % NPD co-evaporated with 30 vol % Teflon 2400
75 vol % NPD co-evaporated with 25 vol % Teflon 2400
80 vol % NPD co-evaporated with 20 vol % Teflon 2400
85 vol % NPD co-evaporated with 15 vol % Teflon 2400
90 vol % NPD co-evaporated with 10 vol % Teflon 2400
95 vol % NPD co-evaporated with 5 vol % Teflon 2400

The first and second substrates were dipped into a bath of solvent for approximately 15 seconds. This was done to dissolve at least some of the NPD from each of the first substrate and the second substrate. The solvent used was acetone. The refractive indices of the resultant substrate and the Teflon 2400 coating for each of the first substrate and the second substrate were decreased, as compared to a substrate with just a Teflon 2400 coating and no dissolution.

The refractive index of the neat NPD layer on the first substrate was n=1.83. The refractive index of a Teflon 2400 coating was n=1.28. Applying the mixture of 25 vol % NPD co-evaporated with 75 vol % Teflon 2400 without dissolution resulted in a refractive index of the second substrate at 500 nm of n=1.40. After dissolution in a manner to completely remove the NPD, the refractive index of the second substrate at 500 nm was n=1.16. It is contemplated that the greater the vol % of NPD used in the mixture for the dissolving process, the more of a reduction in the refractive index can be achieved. For example, a 80% NPD/20% Teflon blend can be used to generate a coating with a refractive index as low as n=1.07.

It should be appreciated that changes can be made to the methods and apparatuses described herein for forming a coating on a substrate to meet a particular set of design criteria. For instance, the particular type of fluoropolymer or fluoropolymeric material that is utilized can be any type that can be configured to cleave the fluoropolymer into molecular fragments via vaporization of the fluoropolymeric source material. In some embodiments, the type of fluoropolymeric material that is used may be a particular type of Teflon material, such as fluoropolymeric material sold under the Teflon AF 1300, Teflon AF 1600, or Teflon AF 2400 brands. In other embodiments, another type of fluoropolymeric material may be used, such as other fluoropolymer brands that are likely to enable a similar diffusion/interlocking repolymerization substrate adhesion capability and/or GLAD low-index capability. In yet other embodiments, another type of deposition source material may be used that is a non-fluoropolymer material. It is contemplated that such a non-fluoropolymeric material that is used as a polymeric coating material would be a type of polymeric material that is found to exhibit properties similar to the fluoropolymeric materials disclosed herein that permit vaporization of the source material to occur in a way that permits cleaved molecular fragments to be formed for directing to a substrate for diffusion into the substrate and subsequent repolymerization within the substrate. The use of these other deposition materials may have refractive indices that are generally higher than a fluoropolymeric material.

As yet another example of changes that may be made, the deposition process parameters may differ from those used when depositing a first layer for multilayer depositing processes. For instance, a deposition rate can be higher than the rate used for depositing the first layer while the same cooling time to cool the substrate after the layer is deposited and the same heating of the substrate may be utilized for the deposition of these subsequent layers. As yet another alternative, a different cooling time and cooling rate may also be used for the deposition of additional layers that are deposited after the first layer is deposited (e.g. longer cooling time, lower cooling temperature of substrate, higher deposition rate, different heating temperature for substrate holder or substrate, different pressure, etc.).

It should therefore be appreciated that while certain present preferred embodiments of generating antireflective coatings for polymeric substrates, apparatuses used to generate such coatings, the formed coatings, substrates having such coatings, and embodiments of methods for making and using the same have been shown and described above, it is to be distinctly understood that the invention is not limited thereto but may be otherwise variously embodied and practiced within the scope of the following claims.

We claim:

1. A method of generating an antireflective coating, the method comprising:
    forming a coating on a surface of a polymeric substrate via a deposition process, the forming of the coating onto the surface of the substrate occurring such that:
    the coating material is vaporized to form chain fragments of the coating material during vaporization of the coating material, the vaporized chain fragments are subsequently diffused into the surface of the polymeric substrate to a depth into the surface of the substrate as layers of the chain fragments are applied onto the surface of the substrate, and the chain fragments diffused into the substrate are subsequently re-polymerized to interlock with polymer chains of the substrate; and
    wherein the depth into the surface of the polymeric substrate is at least 5 nanometers to up to 1 micrometer, and the surface is an outer surface of the polymeric substrate such that the depth extends from the outer surface to the depth within the polymeric surface.

2. The method of claim 1, wherein the coating material comprises a fluoropolymer.

3. The method of claim 1, wherein the coating material comprises a polymetric material.

4. The method of claim 1, wherein the substrate is plastic, acrylic or polycarbonate.

5. The method of claim 1, wherein the substrate is curved.

6. The method of claim 1, wherein the substrate is a curved lens.

7. The method of claim 1, wherein the substrate is a Fresnel lens.

8. The method of claim 1, wherein the deposition process is a glancing angle deposition (GLAD) process.

9. The method of claim 8, wherein the GLAD process further comprises maintaining the substrate at a temperature that is below the glass transition temperature of the substrate.

10. The method of claim 1, wherein vaporization of the coating material occurs via evaporation of the coating material.

11. The method of claim 1, wherein the substrate is a lenslet array.

12. An optical component, comprising:
    a substrate configured for use as an optical element, the substrate having a coating formed on at least a portion of a surface of the substrate, the coating being formed by the method of claim 1.

13. The method of claim 1, wherein:
the substrate is a glass and/or inorganic-coated plastic; and
the substrate is treated with an adhesion promotor configured to promote adhesion of the coating material to the substrate.

14. The method of claim 13, wherein the coating material is a fluoropolymer and the adhesion promotor is a fluorosilane or other silane-based coupling agent.

15. The method of claim 1, further comprising applying heat to the polymeric substrate before, during, and/or after forming the coating on the surface of the polymeric substrate.

16. The method of claim 15, wherein applying heat involves increasing the temperature of the polymeric substrate to promote diffusion of cleaved molecular fragments of the coating material into the surface of the substrate.

17. The method of claim 16, wherein the temperature is less than or equal to a maximum temperature, and the maximum temperature is determined in part by the glass transition temperature of the polymeric substrate.

18. The method of claim 16, wherein increasing the temperature involves increasing the temperature of the polymeric substrate to be within a range from 40° C. to 400° C.

19. The method of claim 16, wherein:
forming the coating involves forming a first coating layer and forming a second coating layer; and
heat is applied to the polymeric substrate before, during, and/or after applying the first coating material layer.

20. The method of claim 19, further comprising:
applying heat to the polymeric substrate so as to reach a predetermined temperature before applying the first coating layer; and
allowing or forcing the temperature of the polymeric substrate to fall below the predetermined temperature before applying the second coating layer.

* * * * *